United States Patent
Eliyahu

(10) Patent No.: US 10,982,569 B2
(45) Date of Patent: Apr. 20, 2021

(54) EXPLOITING COMPRESSION HEAT IN HEAT ENGINES

(71) Applicant: EXENCY LTD, Moshav Shahar (IL)

(72) Inventor: Nitzan Eliyahu, Moshav Shahar (IL)

(73) Assignee: EXENCY LTD., Shahar (IL)

( * ) Notice: Subject to any disclaimer, the term of this patent is extended or adjusted under 35 U.S.C. 154(b) by 28 days.

(21) Appl. No.: 16/045,631

(22) Filed: Jul. 25, 2018

(65) Prior Publication Data

US 2018/0328235 A1    Nov. 15, 2018

Related U.S. Application Data

(63) Continuation-in-part of application No. PCT/US2017/043335, filed on Jul. 21, 2017.

(Continued)

(51) Int. Cl.

| | |
|---|---|
| *F01K 23/08* | (2006.01) |
| *F03G 7/06* | (2006.01) |
| *F01K 25/06* | (2006.01) |
| *F16T 1/00* | (2006.01) |
| *F01K 23/04* | (2006.01) |
| *F01K 23/06* | (2006.01) |
| *F02B 53/02* | (2006.01) |
| *F02G 5/00* | (2006.01) |
| *F02B 53/00* | (2006.01) |

(52) U.S. Cl.
CPC .............. *F01K 23/08* (2013.01); *F01K 23/04* (2013.01); *F01K 23/065* (2013.01); *F01K 25/06* (2013.01); *F02B 53/02* (2013.01); *F02G 5/00* (2013.01); *F03G 7/06* (2013.01); *F03G 7/065* (2013.01); *F16T 1/00* (2013.01); *F02B 2053/005* (2013.01)

(58) Field of Classification Search
CPC . F01K 23/08; F01K 7/36; F01K 11/04; F01K 9/003; F01K 7/40; F01K 7/10; F01K 25/06; F01K 23/065; F01K 23/04; F03G 7/065; F03G 7/06; F16T 1/00; F02G 5/00; F02B 53/02; F02B 2053/005; F22D 7/04
USPC .................................................. 60/670–681
See application file for complete search history.

(56) References Cited

U.S. PATENT DOCUMENTS 3,006,146 A  *   10/1961   Jackson .................. G21D 3/14
                                                       376/391
3,972,195 A  *   8/1976   Hays ........................ F01D 1/06
                                                        60/671

(Continued)

FOREIGN PATENT DOCUMENTS

WO     WO 2018/017980 A1     1/2015

OTHER PUBLICATIONS

Antonelli et al. "Operating maps of a rotary engine used as an expander for micro-generation with various working fluids" Applied Energy. Jan. 1, 2014;113:742-50.

(Continued)

*Primary Examiner* — Hoang M Nguyen

(74) *Attorney, Agent, or Firm* — Pearl Cohen Zedek Latzer Baratz LLP; Aryeh Rosenzweig

(57) ABSTRACT

A dual-cycle heat engine employing a first cycling working fluid and a second cycling working fluid whose cycles overlap when fused into a combined working stream so as to preserve compression heat generated during compression of the first working fluid thereby yielding enhanced work extraction when complying with additional thermodynamic requirements.

16 Claims, 18 Drawing Sheets

Related U.S. Application Data

(60) Provisional application No. 62/365,024, filed on Jul. 21, 2016.

(56) References Cited

U.S. PATENT DOCUMENTS

| | | | |
|---|---|---|---|
| 4,406,135 A | 9/1983 | Rojey et al. | |
| 5,027,602 A * | 7/1991 | Glen | F01K 19/02 60/649 |
| 5,231,832 A | 8/1993 | Tarman | |
| 5,442,914 A | 8/1995 | Otsuka | |
| 6,422,017 B1 | 7/2002 | Bassily | |
| 6,523,347 B1 * | 2/2003 | Jirnov | F01C 1/3442 60/651 |
| 8,082,889 B2 | 12/2011 | Otterstrom et al. | |
| 8,613,195 B2 | 12/2013 | Held et al. | |
| 9,303,533 B2 | 4/2016 | Palmer | |
| 2004/0011038 A1 | 1/2004 | Stinger et al. | |
| 2007/0119175 A1 * | 5/2007 | Ruggieri | F03G 6/065 60/649 |
| 2010/0218513 A1 * | 9/2010 | Vaisman | F01K 7/34 62/6 |
| 2011/0167826 A1 | 7/2011 | Uehara | |
| 2012/0227925 A1 | 9/2012 | Sweeney | |
| 2012/0255303 A1 | 10/2012 | Labbe | |
| 2012/0317983 A1 | 12/2012 | Kalina | |
| 2013/0098029 A1 | 4/2013 | Pinto et al. | |
| 2013/0133328 A1 * | 5/2013 | Timlin, III | F01K 25/06 60/651 |
| 2014/0096524 A1 | 4/2014 | Held et al. | |
| 2015/0176436 A1 | 6/2015 | Palmer | |
| 2015/0377080 A1 | 12/2015 | Fortini et al. | |
| 2018/0328235 A1 | 11/2018 | Eliyahu | |

OTHER PUBLICATIONS

International Search Report for corresponding PCT Application No. PCT/US2017/043335 dated Dec. 26, 2017.
International Search Report for related PCT Application No. PCT/IL2019/050848 dated Nov. 20, 2019.
Supplementary European Search Report for corresponding European Application No. 17831972.9 dated Feb. 21, 2020.

* cited by examiner

EXPLOITING COMPRESSION HEAT IN HEAT ENGINES

BACKGROUND OF THE INVENTION

The world of engines encountered a problem with the development of the internal combustion engine. The mindset in the art was that introduction of the combustion into the engine will improve engine function by maximizing the temperature difference between the heat source and the heat sink; and indeed, this was the case when compared with the old steam engines employing external combustion. However, this gain in efficiency was offset by the inefficient practice of heat discharge either generated from compression or released after expansion.

There are systems directed to increasing utilization of the discarded heat. However, these systems many times are implemented as cogeneration units utilizing discarded residual heat from expansion and not pre-expansion compression heat. Certain large compression systems employ compression heat for heating, while compressed air energy storage systems use the compression heat as a form of energy storage. Neither use pre-expansion compression heat or intermediate temperature condensation heat to increase work output of a heat engine.

In view of the fact that the discharged pre-expansion compression heat or intermediate condensation heat contributes to engine inefficiency, there is a need to utilize this internally generated heat to increase engine efficiency in the production of work.

SUMMARY OF THE INVENTION

According to the teachings of the present invention there is provided a method of exploiting compression heat during work generation in heat-engines, the method including: providing a dual-cycle, heat engine having a first working fluid circulating in a first cycle and a second working fluid circulating in a second cycle; generating compression heat in the first working fluid; combining the first working fluid and the second working fluid into a combined working stream so as to preserve the compression heat in the combined working stream; vaporizing the combined working stream through heating into a vaporized combined working stream; and expanding the vaporized, combined working stream so as to extract work.

According to a further feature of the present invention, the generating compression heat in the first working fluid is implemented through polytropic compression.

According to a further feature of the present invention, the combining the second working fluid and the first working fluid is implemented during the polytropic compression.

According to a further feature of the present invention, the combining the second working fluid and the first working fluid is implemented through isobaric mixing.

According to a further feature of the present invention, the combining the second working fluid and the first working fluid is implemented during polytropic compression of the second working fluid.

According to a further feature of the present invention, the combining the second working fluid and the first working fluid is implemented through isobaric mixing.

According to a further feature of the present invention, the expanding the vaporized combined working stream is implemented adiabatically.

According to a further feature of the present invention, there is also provided splitting the combined working stream into the first working fluid and a second working fluid, the splitting implemented after expansion of the vaporized combined working stream.

According to a further feature of the present invention, there is also provided liquifying the second working fluid.

According to a further feature of the present invention, the liquifying the second working fluid is implemented through isobaric condensation.

There is also provided according to the teachings of the present invention, a dual-cycle, heat engine including: a first working fluid circulating in a first cycle and a second working fluid circulating in a second cycle; a compressor in communication with the first working fluid and the second working fluid, the compressor operative to compress the first working fluid such that compression heat generated in the first working fluid is preserved in a combined working stream formed from the first working stream and the second working stream; a heater operative to vaporize the combined working stream into a vaporized combined working stream; and at least one adiabatic expander configured to expand the vaporized combined working stream so as to extract work.

According to a further feature of the present invention, wherein the compressor is implemented as a Wankel-type compressor.

According to a further feature of the present invention, wherein the compressor is implemented as a polytropic compressor.

According to a further feature of the present invention, the compressor is implemented as an adiabatic two-phase compressor.

According to a further feature of the present invention, wherein adiabatic expanders are implemented as Wankel-type expanders.

According to a further feature of the present invention, there is also provided a combiner configured to isobarically combine the first working fluid and the second the first working fluid into a combined working stream prior to polytropic compression.

According to a further feature of the present invention, there is also provided a splitter configured to split the vaporized combined working stream into the first working fluid and the second working fluid after expansion.

According to a further feature of the present invention, there is also provided a condenser configured to isobarically condense the second working fluid.

According to a further feature of the present invention, there is also provided a stream splitter operative to split the vaporized combined working stream into the first working fluid and the second working fluid after vaporization of the combined working stream.

BRIEF DESCRIPTION OF THE DRAWINGS

The subject matter regarded as the invention is particularly pointed out and distinctly claimed in the concluding portion of the specification. The features, operation and advantages of the invention are best understood in reference to the following detailed description in view of the accompanying drawings in which:

Figure 1B:
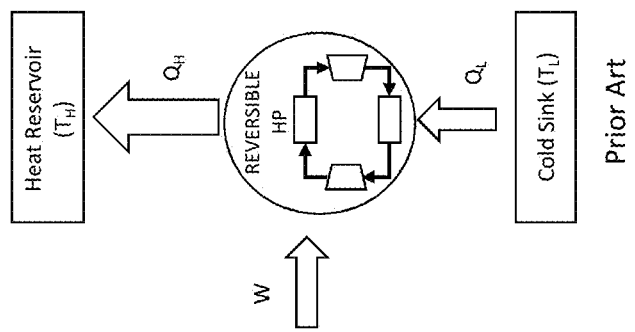
FIG. 1B is a general energy flow diagram of a traditional reversible heat pump, in accordance with prior art.

It will be appreciated that for the sake of clarity, depicted elements may not been drawn to scale and reference numerals may be repeated among figures to indicate corresponding or analogous elements.

DETAILED DESCRIPTION

The present invention is an improved heat engine exploiting customarily discarded, internally generated heat in the form of either compression heat generated prior to expansion or intermediate condensation heat generated after expansion in a heat engine cycle. The use of this internally generated heat negates the necessity to restore lost energy content of the system to extract work, thereby enabling additional energy supplied to the system to be more efficiently exploited during work extraction.

Required entropy increase typically achieved through heat discharge is now achieved also through mixing of the captured of intermediate-temperature compression heat or intermediate-temperature condensation heat and high-temperature external heat supplied to the engine.

The disclosed heat engine replaces the traditional high-temperature, heat source with a combined heat having a medium temperature derived from both the high-temperature heat source and the intermediate temperature, internal heat released prior to expansion from either compression of a working fluid, or in another embodiment, released during working fluid condensation. The reduction of temperature of the combined heat is the chosen tradeoff for the increased energy content; a configuration counter-intuitive to common practice today. The intermediate-temperature heat is recoverable through a second working fluid in physical contact with the working fluid from which the intermediate-temperature heat is emanating.

The following terms will be employed through the present document:

The term "fluid" refers to either a liquid, gas or elastic or variable shape solids.

The term "preliminary heat" refers to internally generated heat released either from pre-expansion compression or condensation of a working fluid implemented as a liquid or gas and heat released from stretching or contraction of a working "fluid" implemented as an elastic solid. It is internally generated heat because the heat is generated from thermodynamic processes, like pressurization, compression, condensation for example, acting on a working fluid employed within the engine and not provided from a heat source external to the engine.

The term "engine" the entire work yielding system regarding the various embodiments. Expanders employed within a system are not deemed engines. In contract, the discussion setting forth the theoretical development, the term "engine" refers to expanders for the sake of clarity.

"Additional" or "external" heat refers to heat provided from a heat source external to the engine.

The term "combined heat" refers to a combination of internally generated intermediary-temperature heat and high temperature heat supplied from a heat source external to the engine. The combined heat drives the engine.

"Integrated work-cycle" refers to a work cycle formed from two parallel work cycles having a degree of overlap during at least one stage of their respective cycles.

"Intermediary condensation" refers to condensation that occurs at an intermediate temperature.

The abbreviation "LP" refers to low pressure.
The abbreviation "MP" refers to medium pressure.
The abbreviation "MHP" refers to medium high pressure.
The abbreviation "HP" refers to high pressure.

It should be appreciated that these terms, and similarly terms of relative temperature, emphasize relative values to each other and are not intended to denote a particular numerical value.

In reference to the relative temperature differences between various heat reservoirs and heat sinks, the abbreviation "$T_L$" refers to a low temperature of the surroundings; "$T_H$" refers to a high temperature of heat external to the engine, and "$T_M$" or "$T_{combined}$" refers to a medium temperature.

Intermediary or intermediate heat refers to heat generated internal to the engine and has an intermediate temperature that is greater than low temperature and less than high temperature external heat. Heat combined from external and intermediary heat is deemed to have a medium temperature for the purposes of this document.

The term "polytropic" refers to process in which the polytropic index, n is between 1 and γ; the ratio of heat capacities $C_p/C_v$. For the purposes of this document, polytropic expansion has a polytropic index n different than that of polytropic compression. Polytropic expansion refers to processes in which the polytropic index n is between γ and the polytropic index of compression whereas polytropic compression has a polytropic index n is closer to 1.

The following details are set forth to provide a thorough understanding of the invention; however, it should be appreciated that the present invention may be practiced without these specific details and that well-known methods, procedures, and components are omitted for the sake of clarity.

Figure 1A:
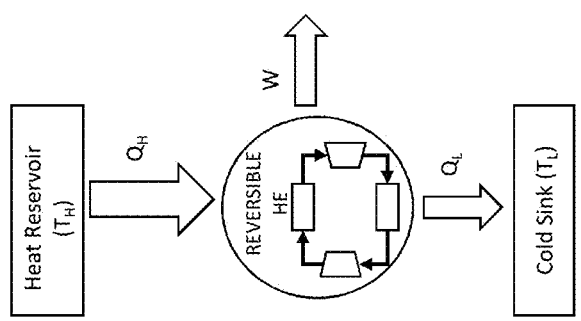
FIG. 1A is general energy flow diagram of a traditional reversible heat engine, in accordance with prior art.

Turning now to the figures, FIG. 1A depicts a general energy flow diagram of a classic reversible heat engine (HE) depicting high-temperature heat $Q_H$ from a hot heat reservoir at high temperature $T_H$ supplied to the engine and low-temperature heat $Q_L$ discharged into a cold heat sink at low temperature $T_L$ in the generation of work W as is known in the art.

In accordance with the first law of thermodynamics:

$$Q_H = W + Q_L$$

The Carnot efficiency of a classic reversible heat engine $\eta_{CE}$ is given as:

$$\eta_{CE} = \frac{|W|}{|Q_H|} = \left(1 - \frac{T_L}{T_H}\right)$$

FIG. 1B depicts a classic reversible heat pump (HP) in which the process is reversed. The Carnot efficiency of such a classic reversible heat pump $K_{CP}$ is given as:

$$K_{CP} = \frac{|Q_L|}{|W|} = \left(\frac{T_L}{T_H - T_L}\right)$$

Figure 1D:
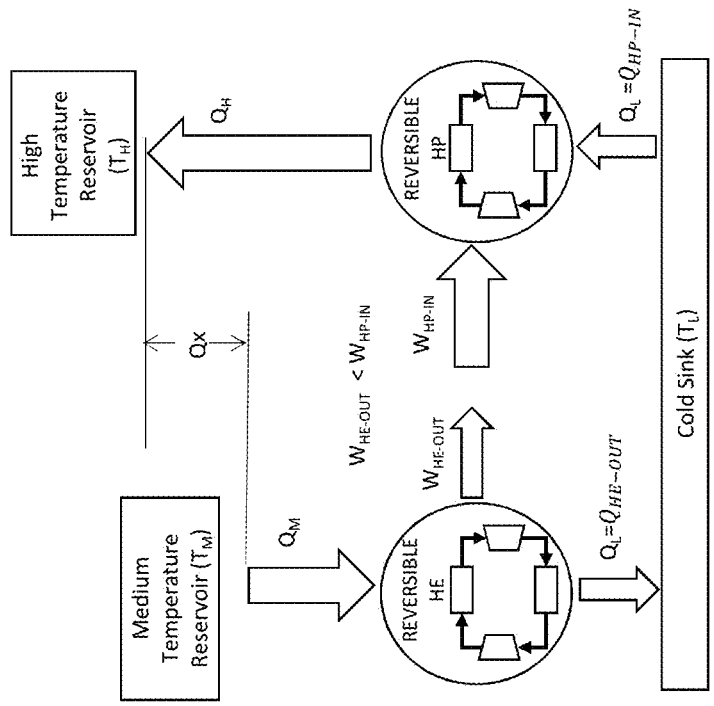
FIG. 1D depicts pump work input and pump heat output required to achieve an engine heat output matching a pump heat input for a reversible heat engine and reversible heat pump functioning independently and sharing a heat sink.
Figure 1C:
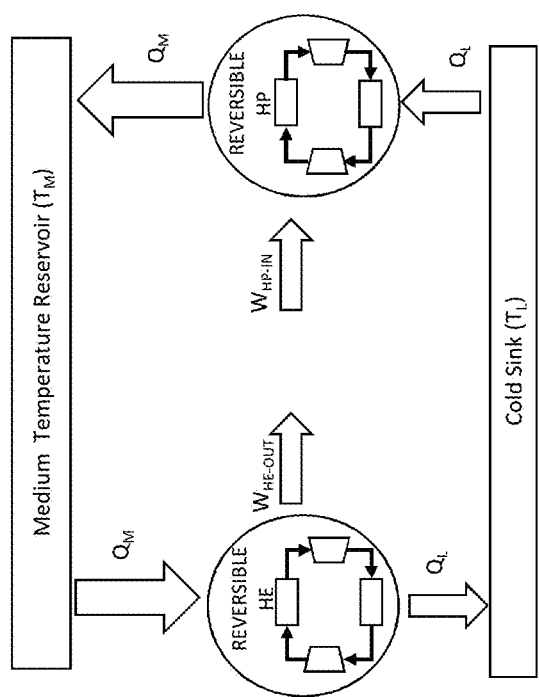
FIG. 1C depicts a non-viable configuration of a reversible heat pump and a reversible heat engine operating between a shared heat source and heat sink.

FIG. 1C depicts a non-viable, theoretical configuration of classic reversible heat engine and classic reversible heat pump having a common medium temperature heat reservoir and low temperature heat sink. As shown, the collective heat and work balance is zero in which there are no net heat losses to the surroundings. Heat intake $Q_M$ of the engine is the same as the heat output $Q_M$ of the pump, and similarly, heat discharge $Q_L$ of the of engine is the same as the heat intake $Q_L$ of the heat pump. Analogously in regards to work, work output $W_{HE-OUT}$ of the engine is the same as work intake $W_{HP-IN}$ of the pump.

However, even on a theoretical level, the absence of an entropy increase of this configuration would render such a configuration inoperative and is a violation of the second law of thermodynamic and would constitute a perpetual motion machine.

FIG. 1D depicts a theoretical configuration of classic reversible heat pump and engine analogous to that depicted in FIG. 1C and is a theoretical model configuration used to determine the provisions needed to render the configuration of FIG. 1C operative and compliant with the second law of thermodynamics.

Assuming the following:
1. The quantity of heat discharged to the cold heat reservoir by the classic reversible heat engine $Q_L$ is equal to the quantity of heat drawn from the cold heat reservoir $Q_L$ by the classic reversible heat pump:

$$Q_L = Q_{HE-OUT} = Q_{HP-IN}$$

2. The temperature of the hot heat reservoir of the classic reversible heat engine is less than the temperature of the hot heat reservoir of the classic reversible heat pump:

$$T_H > T_M$$

In accordance with the first law of thermodynamics:

$$Q_M = W_{HE-OUT} + Q_L$$

$$Q_H = W_{HP-IN} + Q_L$$

The Carnot efficiency of the classic reversible heat engine is:

$$\eta_{CE} = \frac{|W_{HE-OUT}|}{|Q_M|} = \left(1 - \frac{T_L}{T_M}\right)$$

The Carnot efficiency of the classic reversible pump is:

$$K_{CP} = \frac{|Q_L|}{|W_{HP-IN}|} = \left(\frac{T_L}{T_H - T_L}\right)$$

Since the first law of thermodynamics is $Q_L = Q_M - W_{HE-OUT}$ and since the Carnot efficiency of classic reversible heat engine is $$W_{HE-OUT} = \eta_{CE} Q_M = \left(1 - \frac{T_L}{T_M}\right) Q_M$$

it follows:

$$Q_L = Q_M - \left(1 - \frac{T_L}{T_M}\right)Q_M$$

$$Q_L = \frac{T_L}{T_M}Q_M$$

In regard to the classic reversible heat pump, the first law of thermodynamics is $Q_L = Q_H - W_{HP-IN}$ and since the Carnot efficiency of classic reversible pump is $$Q_L = K_{CP}W_{HP-IN} = \left(\frac{T_L}{T_H - T_L}\right)W_{HP-IN}$$

then it follows $$Q_L = \left(\frac{T_L}{T_H - T_L}\right)(Q_H - Q_L)$$

$$Q_L = \left(\frac{T_L}{T_H - T_L}\right)Q_H - \left(\frac{T_L}{T_H - T_L}\right)Q_L$$

$$Q_L(T_H - T_L) = (T_L)Q_H - (T_L)Q_L$$

$$Q_L(T_H) = (T_L)Q_H$$

$$Q_L = \frac{T_L}{T_H}Q_H$$

From here:

$$\frac{T_L}{T_M}Q_M = \frac{T_L}{T_H}Q_H$$

$$Q_M = \frac{T_M}{T_H}Q_H$$

and since $T_H > T_M$ then if follows $Q_H > Q_M$ and from here that $Q_H = Q_M + Q_X$ and since according to a classic reversible heat engine $$W_{HE-OUT} = \left(1 - \frac{T_L}{T_M}\right)Q_M$$

$$W_{HE-OUT} = \left(\frac{T_M - T_L}{T_M}\right)Q_M$$

$$Q_M = \left(\frac{T_M}{T_M - T_L}\right)W_{HE-OUT}$$

Since according to the first law of thermodynamics $Q_L = Q_M - W_{HE-OUT}$ then $$Q_L = \left(\frac{T_M}{T_M - T_L}\right)W_{HE-OUT} - W_{HE-OUT}$$

$$Q_L = \left(\frac{T_M}{T_M - T_L} - 1\right)W_{HE-OUT}$$

$$Q_L = \left(\frac{T_L}{T_M - T_L}\right)W_{HE-OUT}$$

Since Carnot efficiency of a classic reversible heat pump is:

$$Q_L = \left(\frac{T_L}{T_H - T_L}\right)W_{HP-IN}$$

therefore $$\left(\frac{T_L}{T_H - T_L}\right)W_{HP-IN} = \left(\frac{T_L}{T_M - T_L}\right)W_{HE-OUT}$$

Given that $T_H > T_M > T_L$, then $$\left(\frac{T_L}{T_H - T_L}\right) < \left(\frac{T_L}{T_M - T_L}\right)$$

therefore $W_{HP-IN} > W_{HE-OUT}$
From here $W_{HP-IN} = W_{HE-OUT} + W_X$ and from the first law of thermodynamics:

$$W_{HP-OUT} = Q_M - Q_L$$

$$W_{HP-IN} = Q_H - Q_L$$

then when equated $$Q_H - Q_L = Q_M - Q_L + W_X$$

from here $$W_X = Q_H - Q_M$$

and because $$Q_H = Q_M + Q_X$$

then $$W_X = Q_X$$

From here, there needs to be an intermediary irreversible engine between the classic reversible heat engine and the classic reversible heat pump to provide the deficit work between the classic reversible heat engine output $W_{HE-OUT}$ and the classic reversible heat pump requirement $W_{HP-IN}$. The intermediary irreversible engine receives $Q_X$ and converts to $W_X$ which constitutes the difference between the classic reversible heat pump heat output $Q_H$ and the heat of the classic reversible heat engine input $Q_M$. This heat $Q_X$ is rendered theoretically entirely into the deficit work between $W_{HE-OUT}$ and $W_{HP-IN}$ as noted above. The two engines produce more work when only one of them releases heat to the environment and receives heat at the same temperature.

Figure 1E:
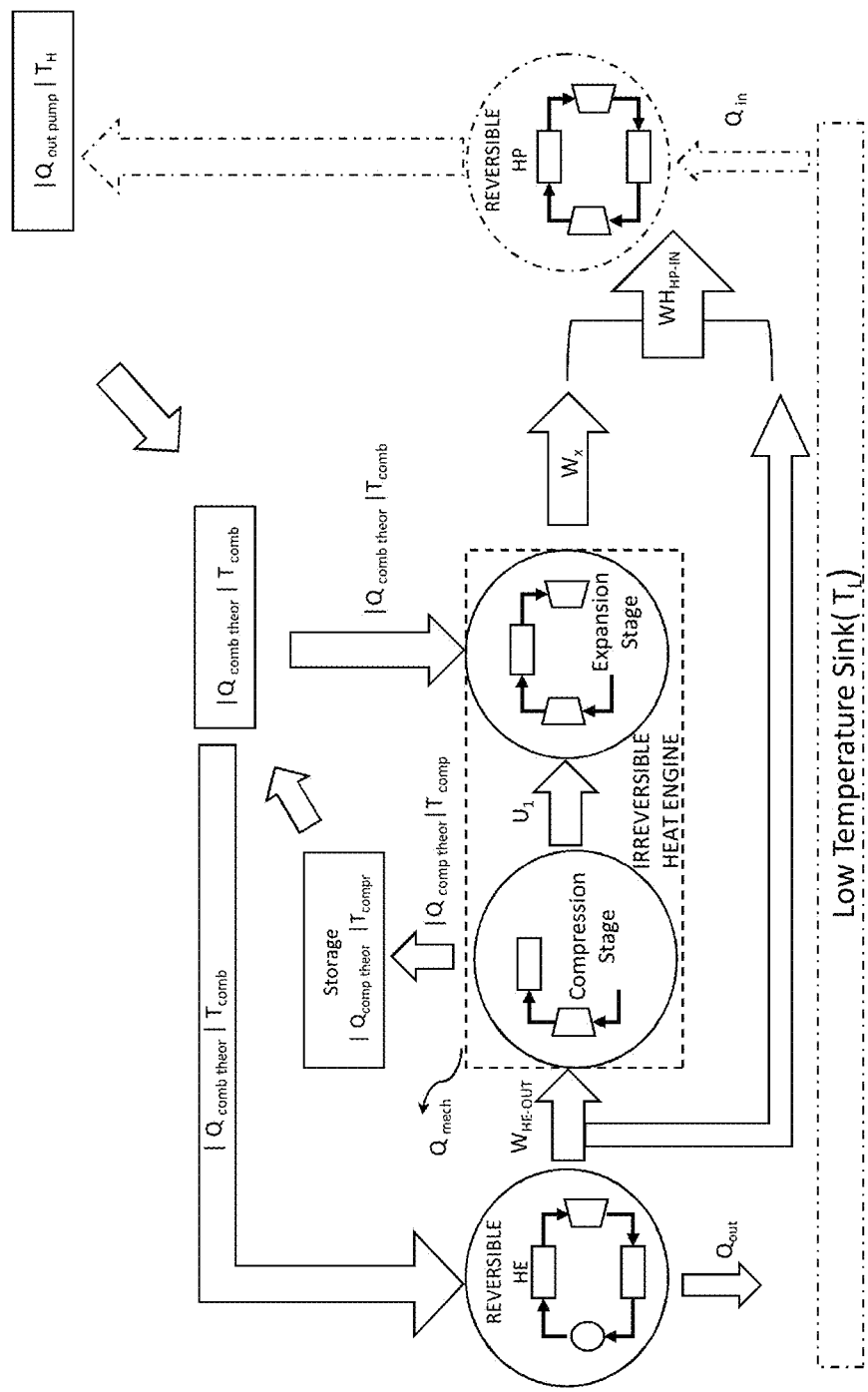
FIG. 1E depicts energy flow of a theoretical two engine configuration, one liquid and one gas, capable of achieving the heat pump input using the heat engine output of the theoretical model depicted in FIG. 1D, according to an embodiment.

FIG. 1E depicts a theoretical energy flow diagram of an irreversible heat engine if it were integrated into a theoretical classic reversible heat engine and classic reversible heat pump arrangement of FIG. 1D to demonstrate the theoretical viability of the irreversible engine as configured.

As shown, the irreversible heat engine, depicted in its compression and expansion stages, provides $W_x$ to make up the difference between the needed classic reversible heat pump work input $W_{HP-IN}$ and the classic reversible heat engine output $W_{HE-OUT}$ as noted above. $W_X$ is provided from $Q_x$ which is the difference of the theoretical, classic reversible heat-pump output $Q_{out\ pump}$ and the theoretical, classic reversible heat-engine input $Q_{in\ engine}$ as denoted in FIG. 1D. In this theoretical model, $Q_x$ is implemented as theoretical combined heat $Q_{comb\ theor}$ derived from a heat mix of theoretical compression $Q_{comp\ theor}$ and theoretical, classic reversible heat-pump output $Q_{out\ pump}$; accordingly, theoretical combined heat $Q_{comb\ theor}$ has a temperature $T_{comb}$ lower than that the temperature of theoretical, classic reversible heat-pump output $Q_{out\ pump}$.

Theoretical combined heat $Q_{comb\ theor}$ theoretically drives the classic reversible heat engine and boosts the energy content U of the working fluid to achieve a work output level meeting the work requirements of the theoretical classic reversible heat pump as noted above.

In this manner the irreversible heat engine is theoretically viable because of the entropy increase emanating from the above noted combination of different heats and rejection of heat to the surroundings from one of the two working streams. It should be appreciated that in practical implementation of the heat engine will function at a less than ideal efficiency in view of mechanical and system heat losses $Q_{mech}$ as is known to those skilled in the art.

Figure 1F:
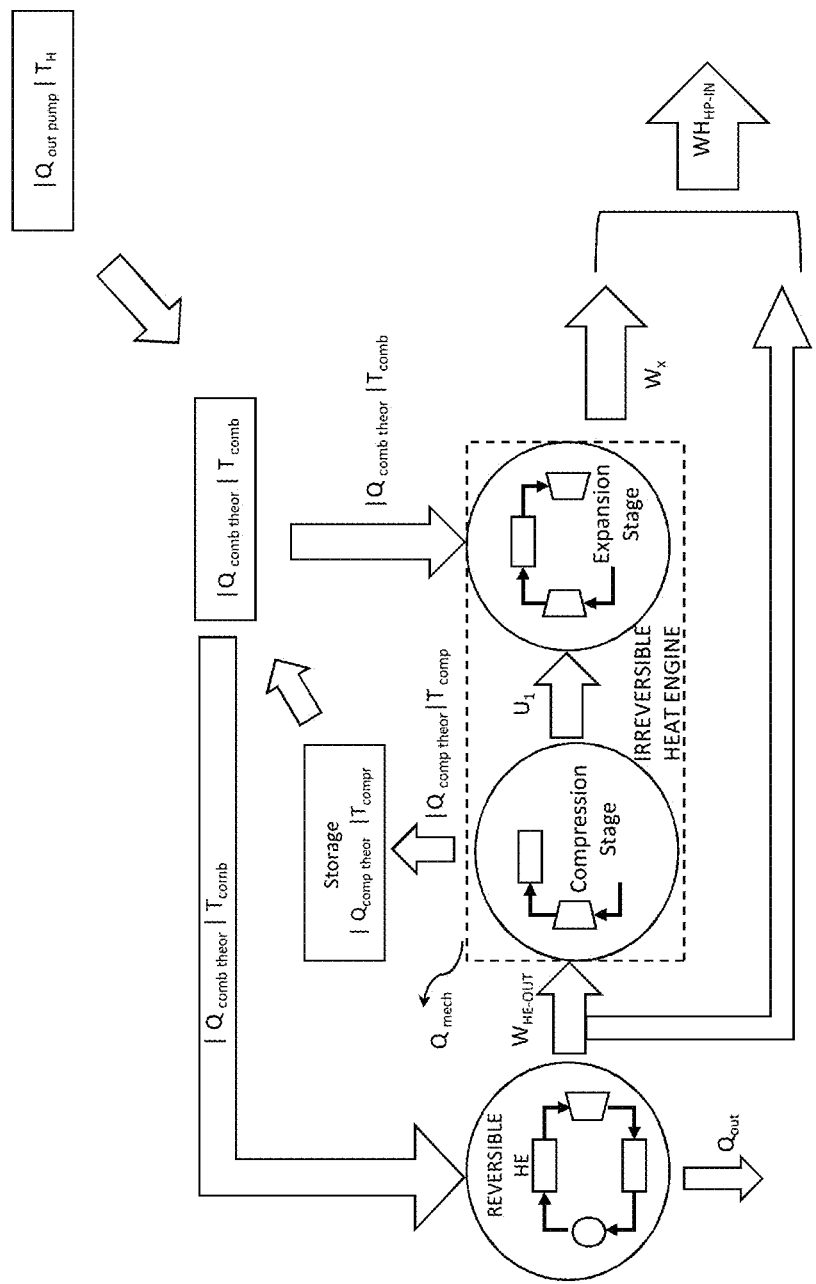
FIG. 1F depicts a configuration of two theoretical engines operating from the same temperature heat source in which only one rejects heat to the heat sink; according to and embodiment.

FIG. 1F depicts a configuration of two theoretical liquid and gas engines operating from the same temperature heat source in which one only rejects heat to the heat sink. As shown, not all of the preliminary work heat is directed to the intermediary engine and the intermediary can receive heat from combined heat and return heat to create combined heat.

Figure 1G:
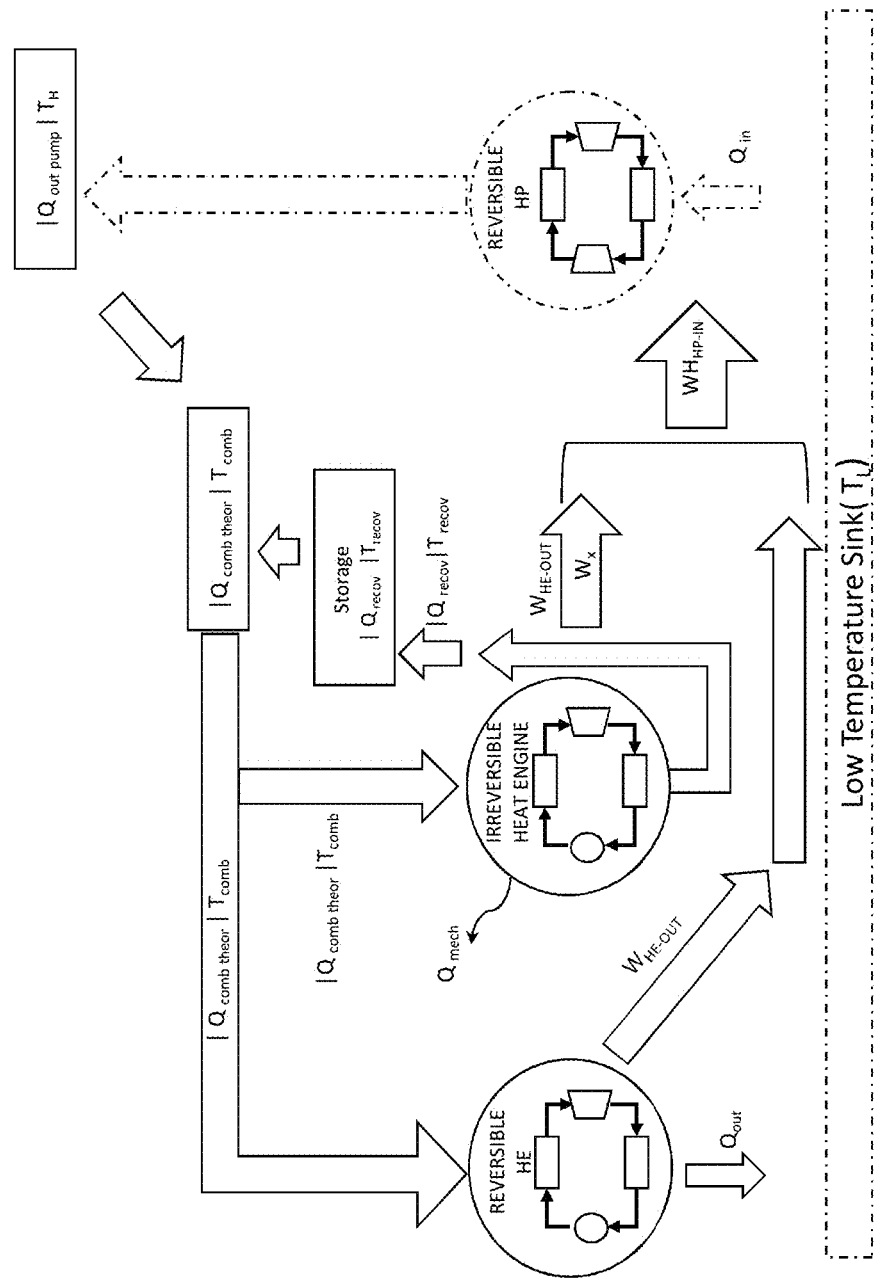
FIG. 1G is a general energy flow diagram of a practical, two-liquid implementation of the irreversible heat engine of FIG. 1E in the absence of work input, according to an embodiment.
Figure 1H:
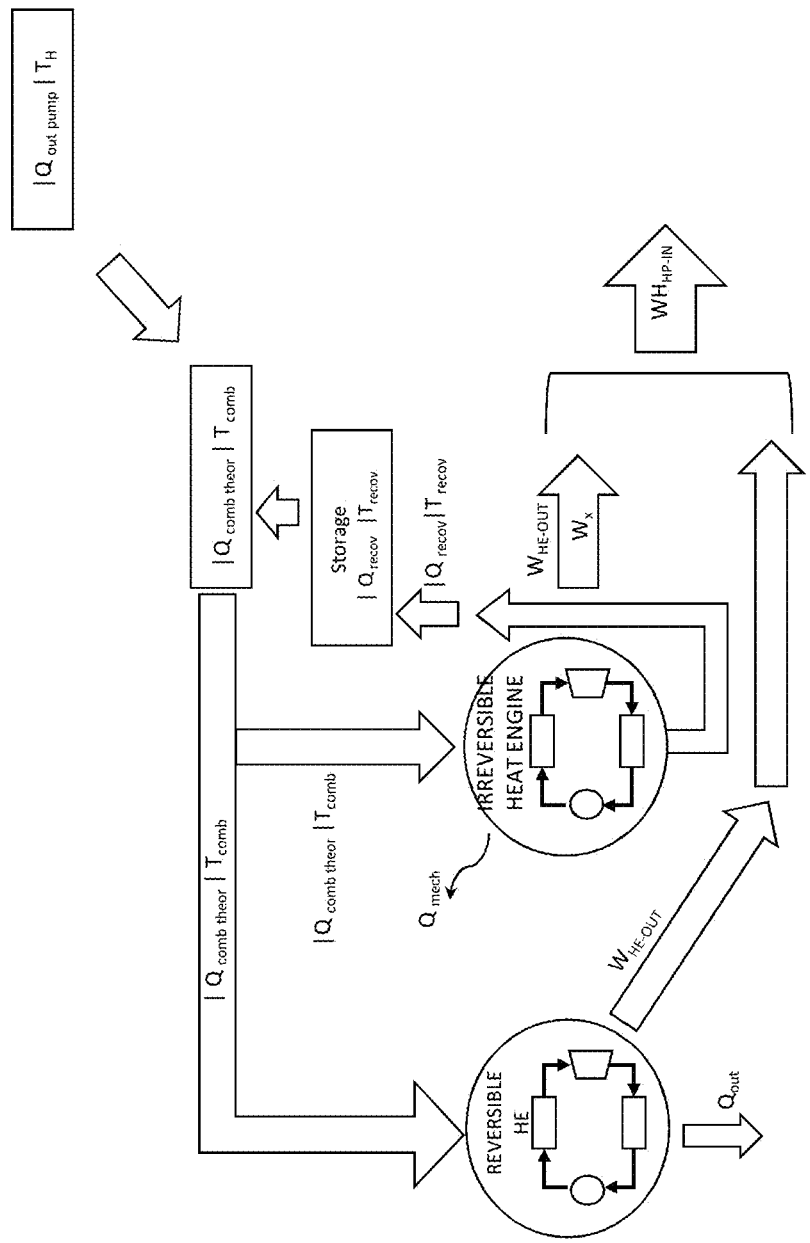
FIG. 1H is a general energy flow diagram of a practical, two-liquid implementation of the irreversible heat engine of FIG. 1G in the absence of work input, according to an embodiment.

FIG. 1G depicts energy flow of a theoretical two engine configuration, one liquid and the other also employing liquid, capable of achieving the heat pump input using the heat engine output of the theoretical model depicted in FIG. 1D, according to an embodiment;

FIG. 1H depicts a configuration of two theoretical engines, each employing a liquid, operating from the same temperature heat source in which only one rejects heat to the heat sink; according to an embodiment.

Following are general features employed to implement the above theory and highlighted through comparison with traditional engines and accepted practice where appropriate. Without diminishing in scope, these features are set forth for an engine employing a compressible working fluid.

In the instant engine, part of the entropy increase is achieved through mixing of different temperature heats into combined heat during the engine cycle prior to work generation. In contrast, traditional engines entropy increase is achieved through discharge of heat at the end of the work cycle.

In the instant engine, efficiency is enhanced through physical placement of the heat source in a location removed from the engine to facilitate mixing of low-temperature compression and high-temperature external. In contrast, the heat source of traditional engines is juxtaposed to the engine to increase efficiency.

In the instant engine, stored compression heat advantageously enables a wide variety of applications. In contrast, traditional engines typically transform heat energy into work in the absence of heat storage capacity.

Figure 2:
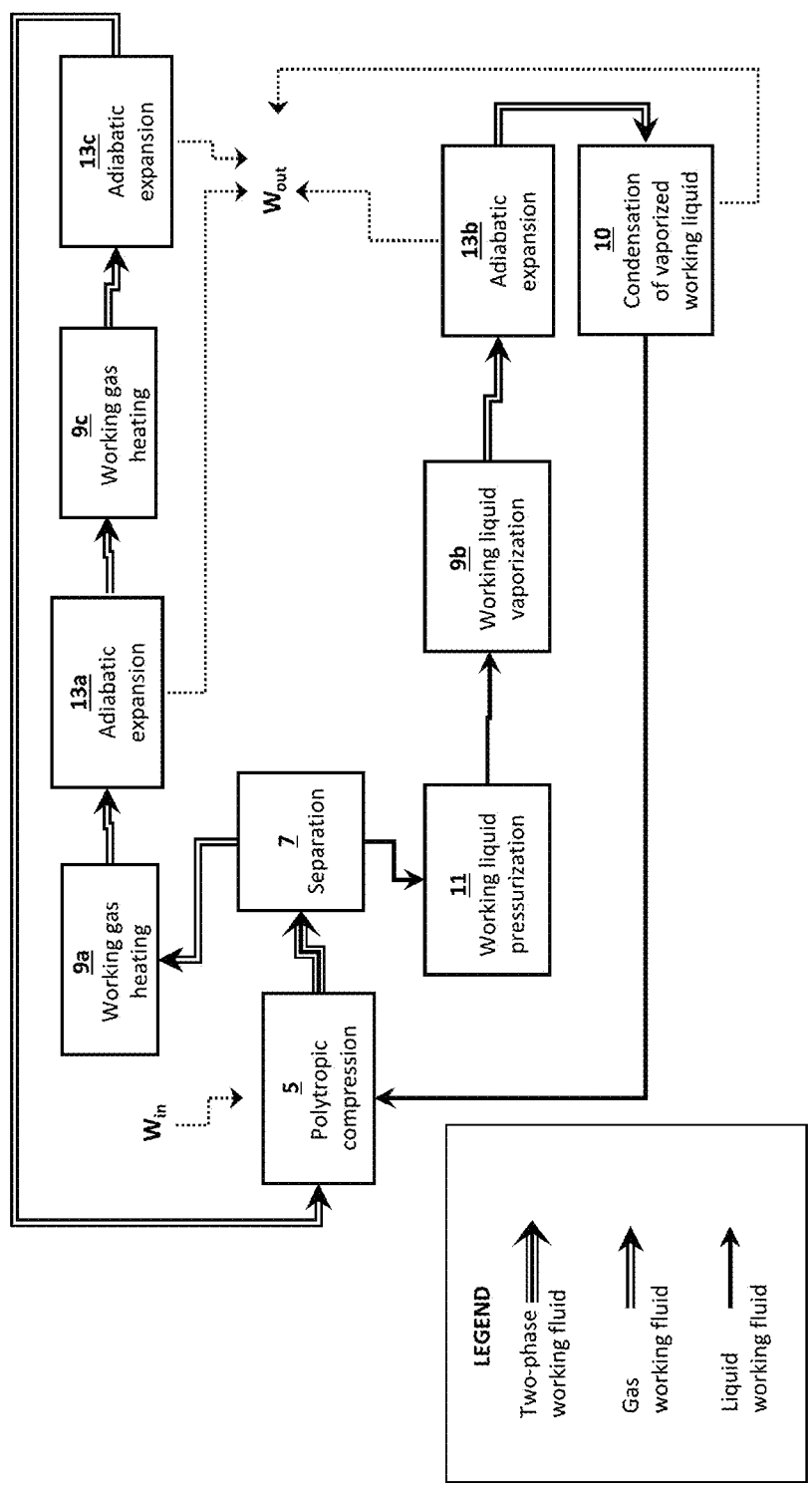
FIG. 2 is a block flow diagram of a first embodiment of heat engine cycle employing a two-component working fluid in which the two-component working fluid is implemented as a gas-liquid working fluid, according to an embodiment.

FIG. 2 is a block flow diagram depicting a process scheme in which the two-component working fluid is implemented as a two-phase working fluid of gas and liquid in physical contact with other. Suitable liquids include, refrigerants R123, R245fa, Toluene, Heptane, Pentane, R134a isobutane water, liquid ammonia, for example and suitable gases include nitrogen, carbon dioxide, air, argon, and ammonia gas for example.

As show, the gas component undergoes polytropic compression 5 and a portion the resulting compression heat is captured by the liquid phase. Heat transfer between the phases is facilitated BY the type of two-phase flow. In a certain embodiment, the phases contact each other in a dispersed two-phase flow, whereas in another embodiment they contact each other in transient two-phase flow, and in another embodiment, in separate two-phase flow. In this manner substantially all preliminary heat compression generated is preserved in either the gas phase or in the liquid phase In a certain embodiment, heat transfer between the phases is substantially complete so that each working fluid is at substantially the same temperature prior to proceed to the next process stage.

After polytropic compression 5, the two-phase working fluid is separated 7 into a working gas and a working liquid.

The working gas is further heated 9a with external high temperature heat and then adiabatically expanded 13a with a heat content derived from both the polytropic compression and the additional heat. The expanded gas is re-heated with high-temperature external heat 9c and re-expanded adiabatically 13c for additional work extraction. The expanded gas is recycled for additional polytropic compression 5.

The working liquid is further pressurized 11 in a certain embodiment, and vaporized 9b with high-temperature external heat. The vaporized working liquid is then adiabatically expanded 13b with a combined heat content and work extracted. Additional work is extracted through condensation 10 back into working liquid. The condensate working liquid is recycled and combined with the recycled, work-extracted working gas to combine into a two-phase working fluid prior to reiterative polytropic compression 5, as noted above.

Figure 3:
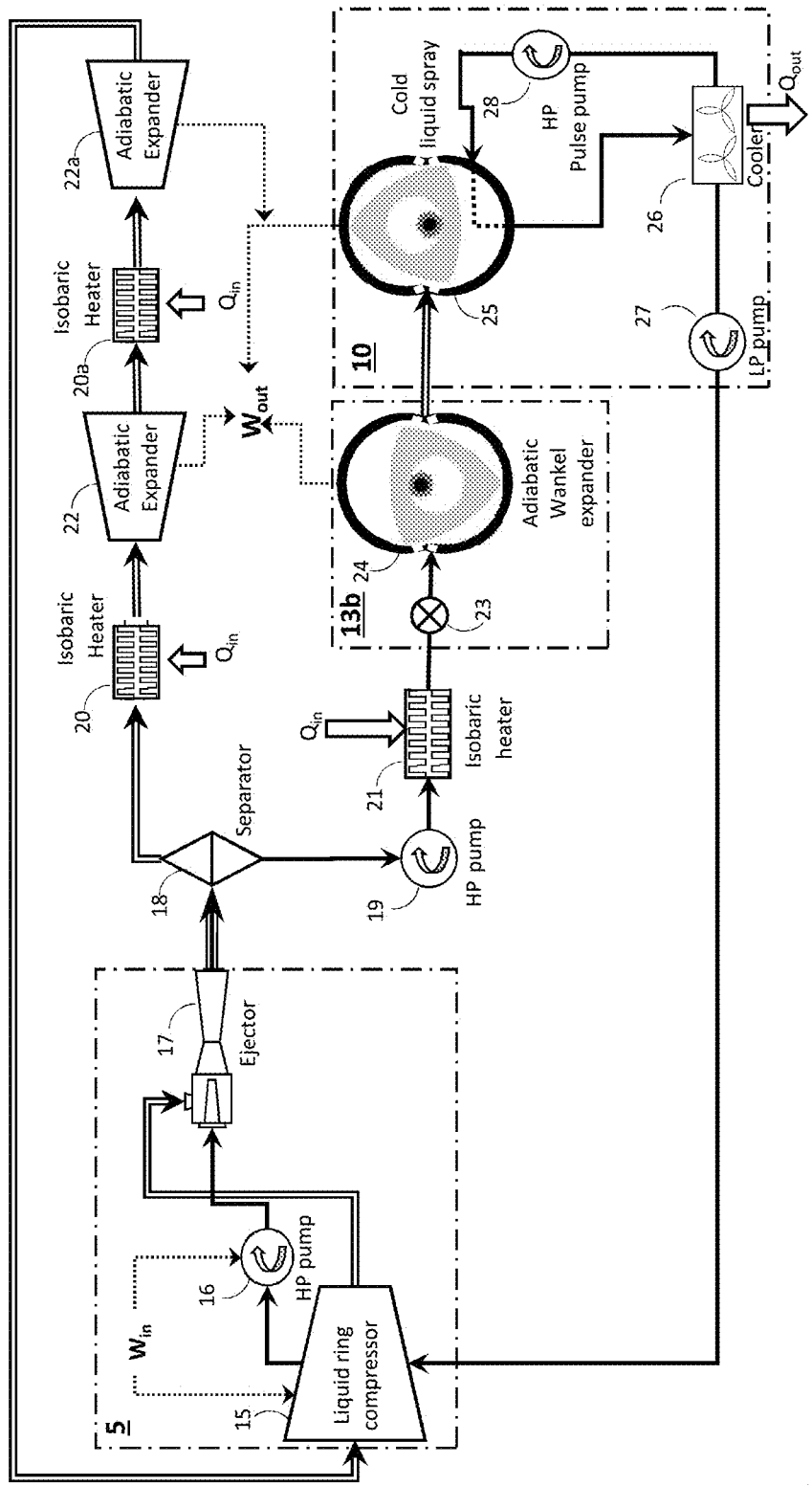
FIG. 3 is a schematic diagram of a physical implementation of the heat engine cycle of FIG. 2, according to an embodiment.

FIG. 3 is a schematic depiction of a physical implementation of the process scheme depicted in FIG. 2, according to an embodiment.

Polytropic compression 5 is implemented as a compression unit having a liquid ring compressor 15, a high-pressure pump 16, and a venturi ejector 17, in a certain embodiment. It should be noted that although the specific thermodynamic states are unspecified for each of the stages embodied in compression unit 5, the states at the inlet and outlet for the compression unit are known as will be discussed. It should also be appreciated that in a certain other embodiment the polytropic compression unit is implemented with a high-pressure pump and venturi ejector while in another embodiment the compression unit is implemented with only a liquid ring compressor.

Liquid ring compressor 15 is configured to discharge working liquid to high pressure pump 16 where the working liquid is pressured and driven through venturi ejector 17 creating a suction drawing in the compressed working gas and ejecting a two-phase working fluid. A portion of the compression heat of the working gas is captured by the working liquid during contact through the venturi ejector such that the two-phase working fluid is loaded with substantially all the heat generated during all compression stages thereby increasing work yield in future expansion.

After polytropic compression, the two-phase working fluid undergoes separation into separate gas and liquid components at separator 18.

Isobaric heating of the working gas is implemented at heat exchanger 20 and adiabatic expansion and work extraction is implemented at expander 22. Additional, isobaric heating of the expanded working gas is implemented at second isobaric heater 20a and subsequent adiabatic expansion is implemented at adiabatic expander 22a. It should be appreciated that expander 22 or 22a may be implemented as one or more linked pistons, expanders, turbines, screw expanders or other expansion equipment providing similar functionality. One or more serially linked expanders are deemed as an expander set.

Working liquid separated from the two-phase working fluid at separator 18 is pressurized at high pressure pump 19, in a certain embodiment, and vaporized at isobaric heater 21 with the addition of heat $Q_{in}$ sufficient to vaporize the working liquid. Adiabatic expansion 13b is achieved through intermittent feed of the vaporized working liquid into Wankel expander 24 by means of control valve 23, in a certain embodiment. As noted, in certain embodiments, using other types expansion equipment is employed.

After adiabatic expansion additional work is extracted in condensation unit 10. Condensation unit 10 includes a Wankel condenser 25, an isobaric cooler 26, and a high-pressure pulse pump 26, according to an embodiment. The vaporized working liquid is condensed in a Wankel condenser 25 and a portion of the condensate is cooled at isobaric cooler 26 where heat is discharged to the surroundings. The cooled condensate is ejected onto the Wankel cooler by high-pressure pump 28 to provide instantaneous cooling of the vaporized working liquid while extracting additional work of condensation. In certain embodiments, condensation is achieved in the absence of work extraction.

Low pressure pump 27 recycles the now liquid working fluid to the polytropic compression unit 5 for polytropic compression.

Figure 4B:
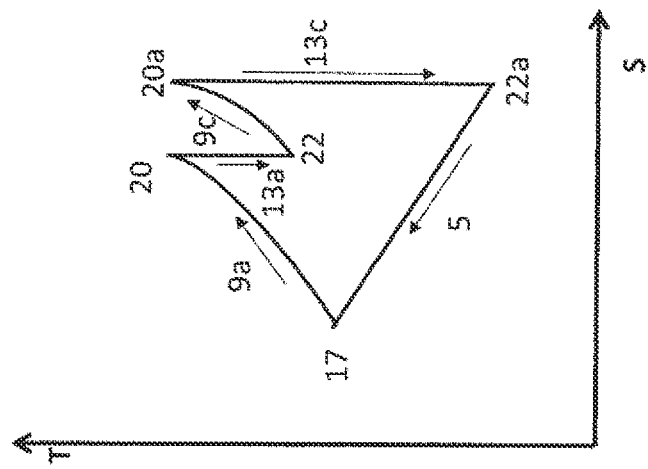
FIG. 4B is a temperature-entropy diagram of a simulation of the embodiment depicted in FIGS. 2-3, according to an embodiment.
Figure 4A:
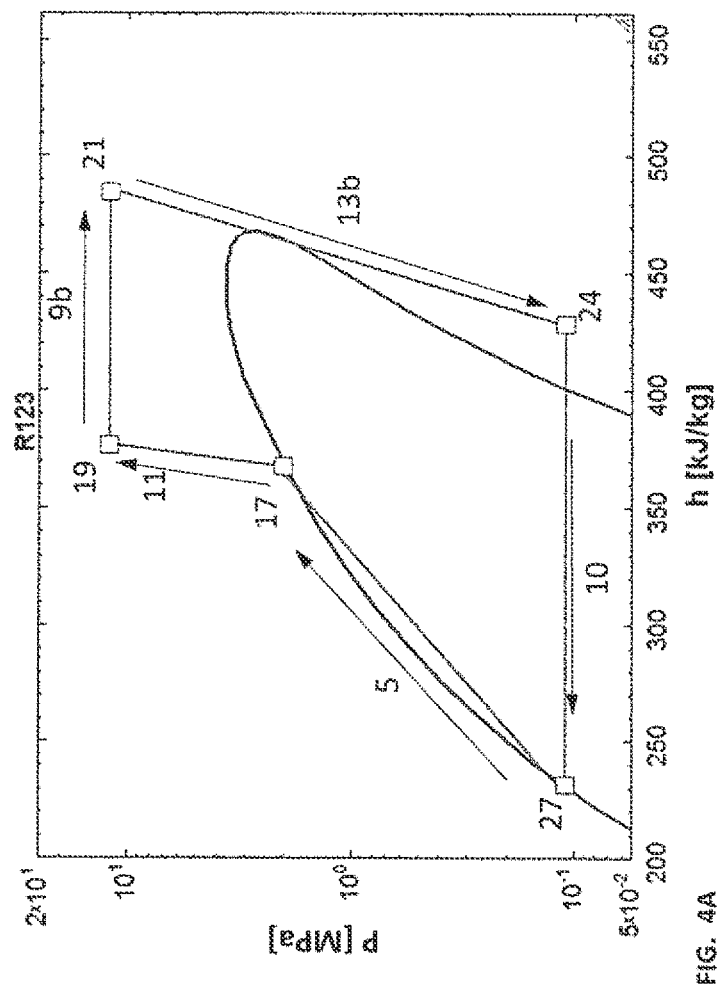
FIG. 4A is a pressure-enthalpy diagram of a simulation of the embodiment depicted in FIGS. 2-3, according to an embodiment.

FIG. 4A are FIG. 4B pressure-enthalpy and temperature-entropy diagrams, respectively, for a simulation of the embodiment set forth in FIGS. 2-3. The cycle segment labels correspond to the processes set in FIG. 2 and the cycle endpoints correspond to working fluid conditions at the outlets of the corresponding process equipment set forth in FIG. 4. Conditions for the liquid phase for the working fluid are set forth in Table 1 below:

TABLE 1

LIQUID PHASE WORK CYCLE
Refrigerant R123
1.181 kg

| | P (Mpa) | T (° C.) | H (kj/kg) | Heat (kJ) | Work (kJ) |
|---|---|---|---|---|---|
| Inlet ring compressor 15 | 0.11 | 30.0 | 231.4 | 0.00 | 0.00 |
| Outlet ring compressor 15 | 2.0 | 146.5 | 367.2 | 160.38 | 0.00 |
| Adiabatic pump outlet 19 | 12.0 | 157.6 | 376.3 | 0.0 | 10.75 |
| Isobaric boiler outlet 21 | 12.0 | 240 | 484.6 | 127.90 | |
| Adiabatic expander outlet 24 | 0.11 | 55 | 427.8 | 0.00 | −67.0 |
| Isobaric condenser outlet 27 | 0.11 | 30 | 231.4 | −231.95 | |
| | | | | 56.33 | −56.33 |

The efficiency in the liquid-phase working-fluid is set forth in Table 2 below:

TABLE 2

LIQUID PHASE WORK CYCLE
Refrigerant R123
1.181 kg
Efficiencies

| Work of condensation (kJ) | Net work (kJ) | Efficiency (%) | Carnot efficiency (%) |
|---|---|---|---|
| 21.26 | 56.33 | 19.5 | 40.9 |

The condition of the gas-phase working fluid are set forth in the Table 3 below:

TABLE 3

GAS-PHASE WORK CYCLE
Nitrogen
0.856 kg

| | P (Mpa) | T (° C.) | Heat (kJ) | Work (kJ) |
|---|---|---|---|---|
| Outlet ring compressor 17 | 2.00 | 146.5 | −160.38 | 234.39 |
| Isobaric boiler outlet 20 | 2.00 | 240 | 83.17 | |
| Adiabatic expander outlet 22 | 0.70 | 106.20 | | −108.79 |
| Isobaric boiler outlet 20a | 0.70 | 240.00 | 119.04 | |
| Adiabatic expander outlet 22a | 0.11 | 30.000 | | −167.43 |
| | | | 41.83 | −41.83 |

The increase in efficiency achieved with the two-phase working-fluid relative to a single liquid phase working fluid is set forth tin Table 4 below:

TABLE 4

Integrated Efficiency of Liquid R123 and Gaseous Nitrogen

| Integrated Efficiency (%) | Integrated Total Efficiency (%) | Efficiency Gain Relative to Single R123 Working Stream (%) |
|---|---|---|
| 29.7 | 36.2 | 85.6 |

Figure 5:
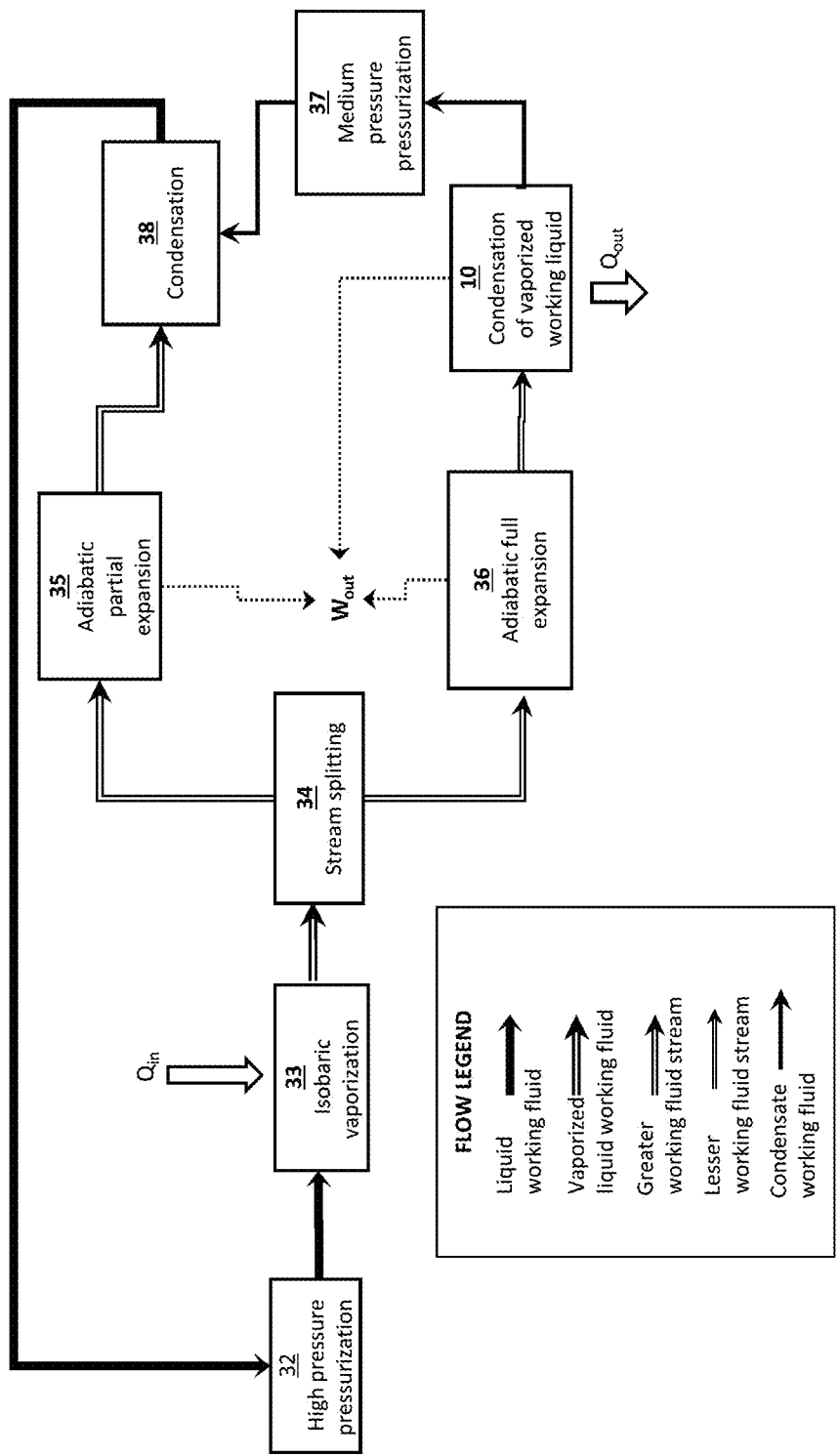
FIG. 5 is a block flow diagram of a second embodiment of a heat engine cycle employing a two-component working fluid, in which the two-component working fluid is implemented as a liquid-liquid working fluid of the same identity, according to an embodiment.

FIG. 5 is a block flow diagram of an embodiment of the heat engine in which the two-component working fluid is implemented as two liquids having the same identity. Suitable working liquids include the above noted substances.

As shown, the two liquid working fluids are merged into a single liquid stream during pressurization 32 and isobaric heating 33 where the merged liquid steam is vaporized. The vaporized liquid stream is then split 34 into two streams of unequal mass flow, in an embodiment. Both streams are adiabatically expanded in parallel; however, the stream of lesser mass flow is partially expanded 35 while the stream of greater mass flow is fully expanded 36. The full expansion advantageously reduces heat ejection to the surroundings in subsequent condensation 10. After condensation 10, the condensate is pressurized 37 and brought into physical contact with the partially expanded, vaporized liquid stream, causes its condensation 38, and merges with the new condensate. Condensation heat released is captured by the pressurized condensate and advantageously pre-heats the pressurized condensate and then merges with the new condensate to form a single liquid working stream. The combined liquid working stream is recycled for pressurization 32 as shown.

It should be appreciated that in a certain embodiment the stream splitting is implemented into streams of equivalent mass flow. In regard to condensation work, a certain other embodiment extracts work at only one of the work streams, whereas work is not extracted during condensation. Furthermore, in a certain embodiment, heat is rejected to the surroundings from both work streams.

Figure 6:
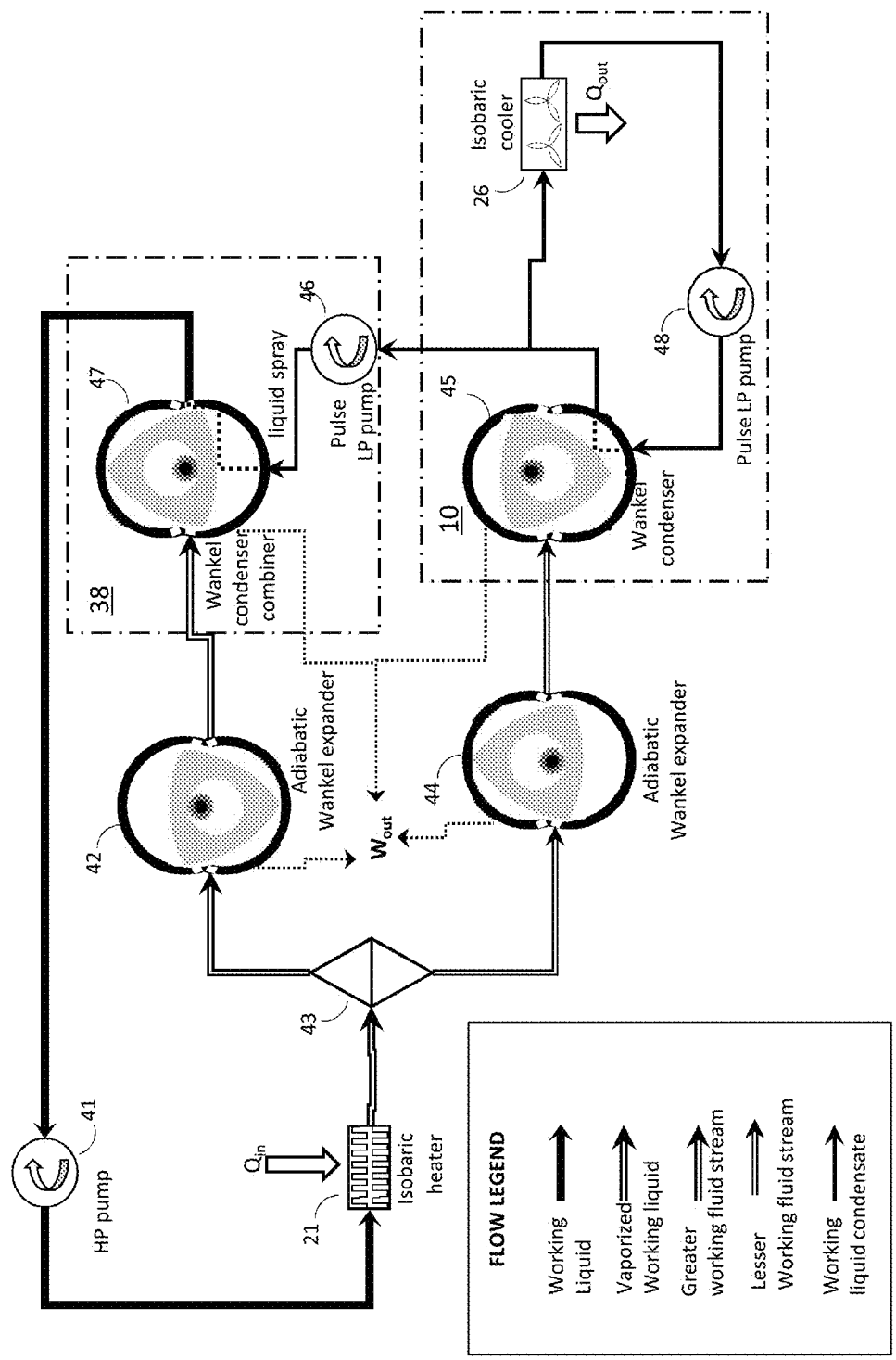
FIG. 6 is a schematic diagram of a physical implementation of the heat engine cycle of FIG. 5, according to an embodiment.

FIG. 6 is a schematic depiction of a non-limiting implementation of the schematic, block flow diagram FIG. 5.

As shown, a merged liquid working stream is pressurized at high pressure pump 41, vaporized at isobaric heater 21, and divided into a first working fluid and a second working fluid at splitter 43 of unequal mass flow.

As shown, each of the working streams is separately, adiabatically expanded in parallel in adiabatic Wankel expanders 42 and 44. Expander 44 is configured to operate at a greater expansion ratio than that of expander 42. After expansion at expander 44, the second working fluid is cooled 10 through condensation in Wankel condenser 45 to advantageously extract additional work, in this embodiment. As shown a portion of the resulting condensate is further cooled in an isobaric cooler 26, where waste heat is ejected to the surroundings, and recycles to cool the working stream in condenser 45 after pressurization at low pressure pulse pump 48. As shown, the condensate of the second working fluid is pressurized at low pressure pulse pump 46 and pulse injected into Wankel condenser combiner 47 to condense the first working fluid in the presence of work extraction. Advantageously, the condensate of the second working fluid combines with the first working fluid at expander combiner 47 so that heat released from the condensing work stream is captured by the cooling condensate. The capture of this heat constitutes preliminary heating of the cooler condensate stream prior to additional heating as a portion of a merged condensate. The merged condensates are recycled as a single liquid working stream to isobaric heater 21 for re-vaporization.

Figure 7:
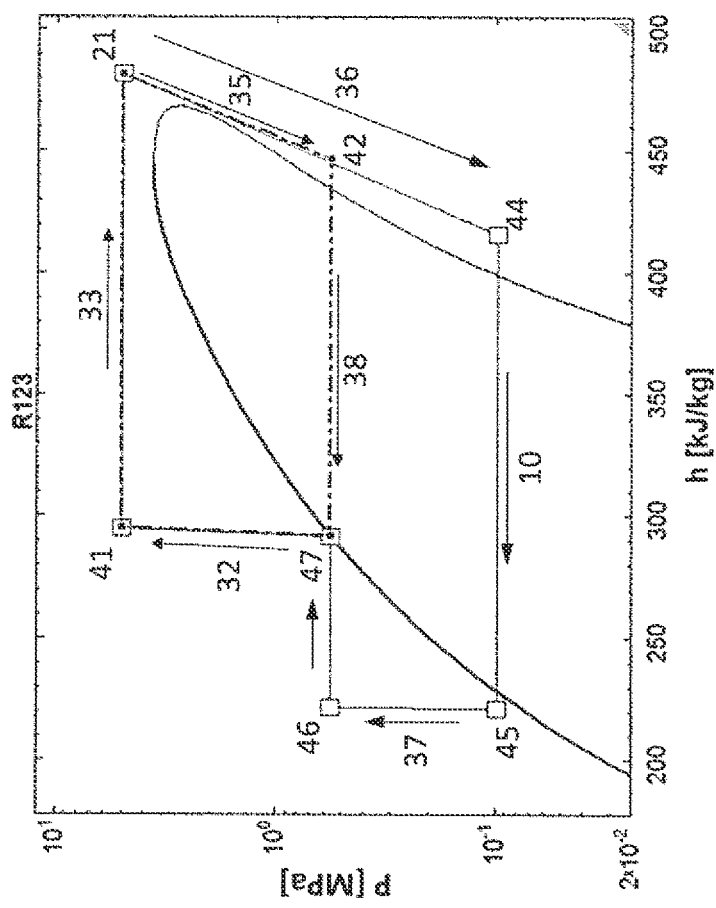
FIG. 7 is a pressure-enthalpy diagram of a simulation of the embodiment depicted in FIGS. 5-6, according to an embodiment.

FIG. 7 is pressure-enthalpy diagram depicting a simulation of work cycles of the embodiment depicted in FIGS. 5-6 in accordance with the labelling convention set forth above. Table 5 bellow sets forth the operating conditions and efficiencies for the work-cycle.

TABLE 5

| REFRIGERANT R123 | | | | | |
|---|---|---|---|---|---|
| Primary work-cycle 2.216 kg | | | | | |
| | P (Mpa) | T (° C.) | H (kj/kg) | Heat (kJ) | Work (kJ) |
| Pump outlet 46 | 0.56 | 20.2 | 221.3 | 0.0 | 0.7 |
| Boiler outlet 47 | 0.56 | 85.5 | 291.3 | 155.0 | 0.0 |
| Pump outlet 41 | 5.0 | 88.0 | 294.7 | 0.0 | 8.0 |

TABLE 5-continued

| REFRIGERANT R123 | | | | | |
|---|---|---|---|---|---|
| Expander outlet 21 | 5.0 | 210.0 | 481.4 | 413.7 | 0.0 |
| Boiler outlet 44 | 0.10 | 50.0 | 415.8 | 0.0 | −145.4 |
| Condenser outlet 45 | 0.10 | 50.0 | 221.0 | −432 | 0.0 |
| | | | | 137.2 | −137.2 |

| Efficiencies | | | |
|---|---|---|---|
| Work of condensation (kJ) | Net work (kJ) | Efficiency (%) | Carnot efficiency (%) |
| 37.5 | 137.2 | 24.1 | 39.3 |

As shown the efficiency as is known in the art.

Following, Table 6 sets forth operating parameters and efficiencies for secondary work-cycle.

TABLE 6

| REFRIGERANT R123 | | | | | |
|---|---|---|---|---|---|
| Secondary work-cycle 1.0 kg | | | | | |
| | P (Mpa) | T (° C.) | H (kj/kg) | Heat (kJ) | Work (kJ) |
| Pump outlet 41 | 5.0 | 88.0 | 295.2 | 0.0 | 3.4 |
| Boiler outlet 21 | 5.0 | 210.0 | 481.4 | 186.2 | 0.0 |
| Expander outlet 42 | 0.56 | 100.0 | 446.8 | 0.0 | −34.6 |
| Condenser outlet 47 | 0.56 | 85.5 | 291.8 | −155.0 | 0.0 |
| | | | | 31.2 | −31.2 |

| Efficiencies | | | |
|---|---|---|---|
| Work of condensation (kJ) | Net work (kJ) | Efficiency (%) | Carnot efficiency (%) |
| 17.5 | 31.2 | 16.8 | 25.8 |

Following, Table 7 sets forth operating parameters and efficiencies for integrated work-cycle.

TABLE 7

| Efficiencies of Integrated Primary and Secondary Working-streams Mass 3.2 kg | | | |
|---|---|---|---|
| Efficiency without condensation (%) | Efficiency with condensation (%) | Efficiency gain relative to a regular cycle efficiency without condensation (%) | Efficiency gain relative to a standard cycle efficiency with condensation (%) |
| 28.1 | 37.2 | 16.6 | 54.4 |

As shown, efficiency of the integrated working streams advantageously provides an efficiency gain relative to the efficiency of a standard single working-stream (Described here as a primary working-stream) by more than 16% and when implemented with work yielding condensation a much higher efficiency of over 54% is achieved.

Figure 8:
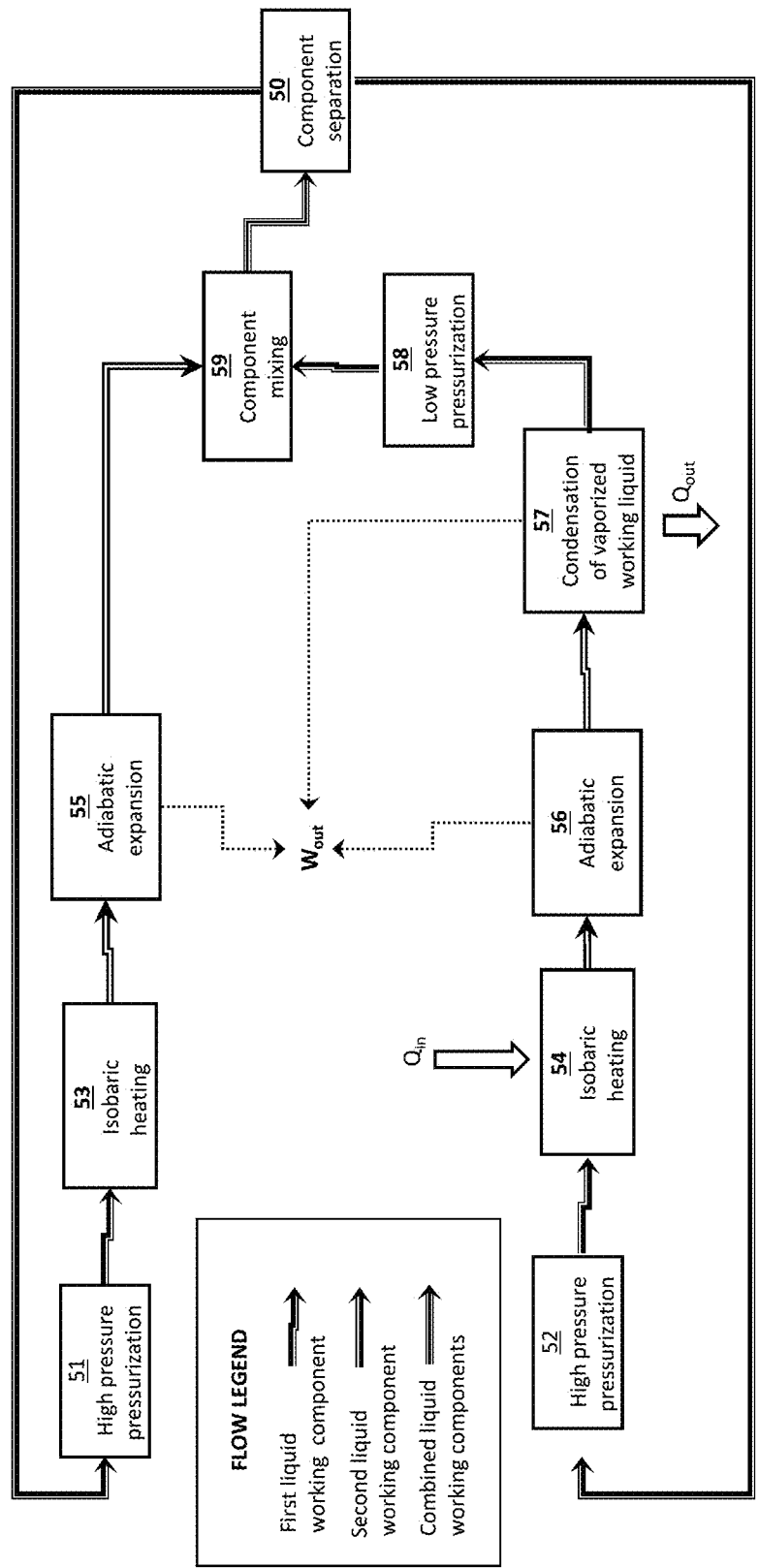
FIG. 8 is a block flow diagram of a variant embodiment of a heat engine cycle employing a liquid-liquid working fluid in which the two liquids have different identities, according to an embodiment.
Figure 9:
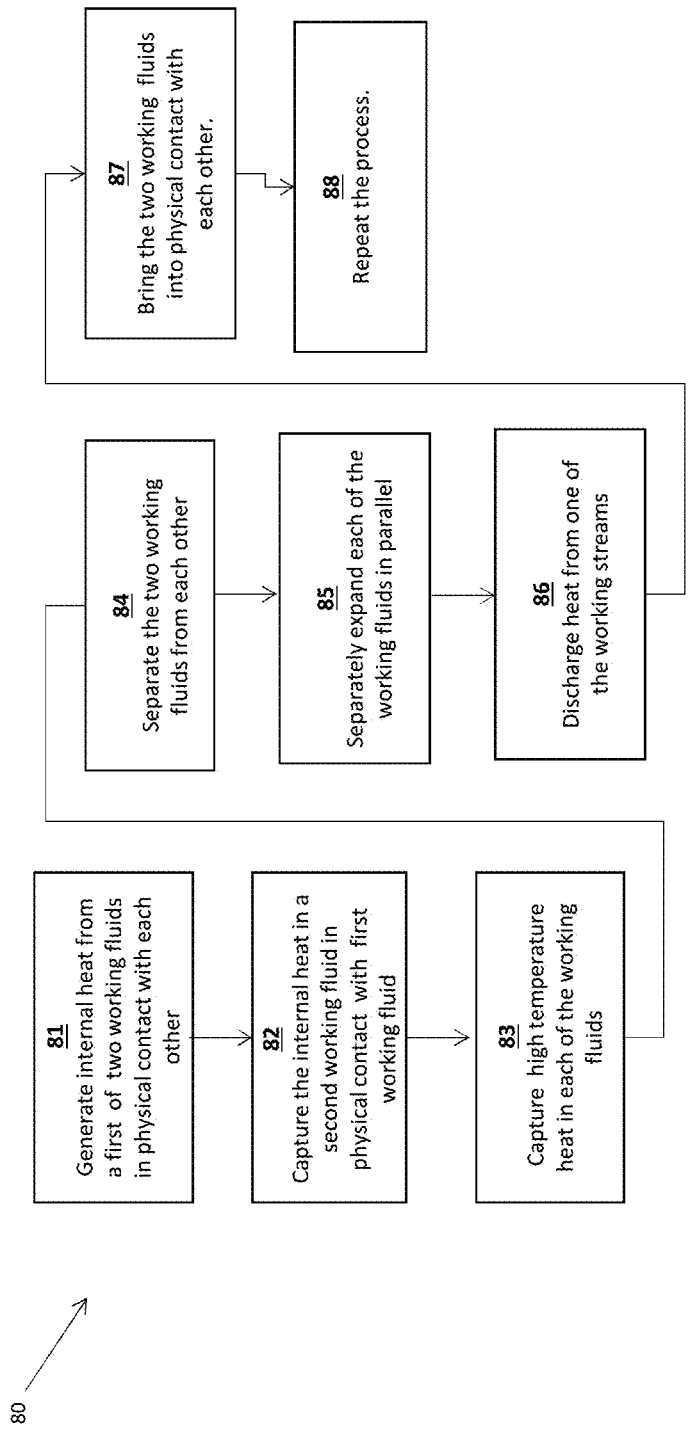
FIG. 9 is a flow chart depicting steps employed in an embodiment of the heat engine.

FIG. 8 is a block process diagram depicting a variant embodiment of the engine employing a two-component liquid working fluid in which the two liquids having different identities like water plus R123, water plus Toluene, and various other immiscible liquids.

As shown, each of the two components of the working fluid, in parallel are separately pressurized 51 and 52 to a high pressure, isobarically vaporized 53 and 54, and adiabatically expanded 55 and 56, respectively. As shown, second liquid working component is condensed 57 and optionally and produces work though the condensation as described above. The resulting condensate is pressurized and combined with first liquid component at combiner 59. The mixing of the condensate of the second liquid component with the vaporized, partially expanded, first liquid component condenses the first component while capturing condensation heat released as noted above. The condensate mixture is separated 50 and each component is recycled.

FIG. 10 is a flow chart 80 depicting the steps employed in an embodiment of the heat engine. This is implemented in different ways depending on the working fluid employed; compression or condensation for gas, pressurization for liquid, contracting and expansion for elastic solids.

In step 81, generate internal heat in a first of two working fluids in physical contact with each other. In step 82, capture the internal heat in a second working fluid in physical contact with first working fluid. In step 83, capture high temperature heat in each of the working fluids prior to expansion. In step 84, separate the two working fluids from each other to facilitate subsequent separate and parallel work yielding expansion. In step 85, separately expand each of the working fluids in parallel. In step 86, cool one of the working fluid streams and discharge heat to the surroundings. In step 87, bring the two working fluids into physical contact with each other. In step 88, recycle the working fluids to repeat the process.

It should be appreciated that features set forth in a particular embodiment also have application in other embodiments. In which those features are not mentioned.

It should be appreciated that such regenerative heating schemes in certain embodiments are also employed in cylinder based embodiments of the heat engine.

Figures 10A, 10B:
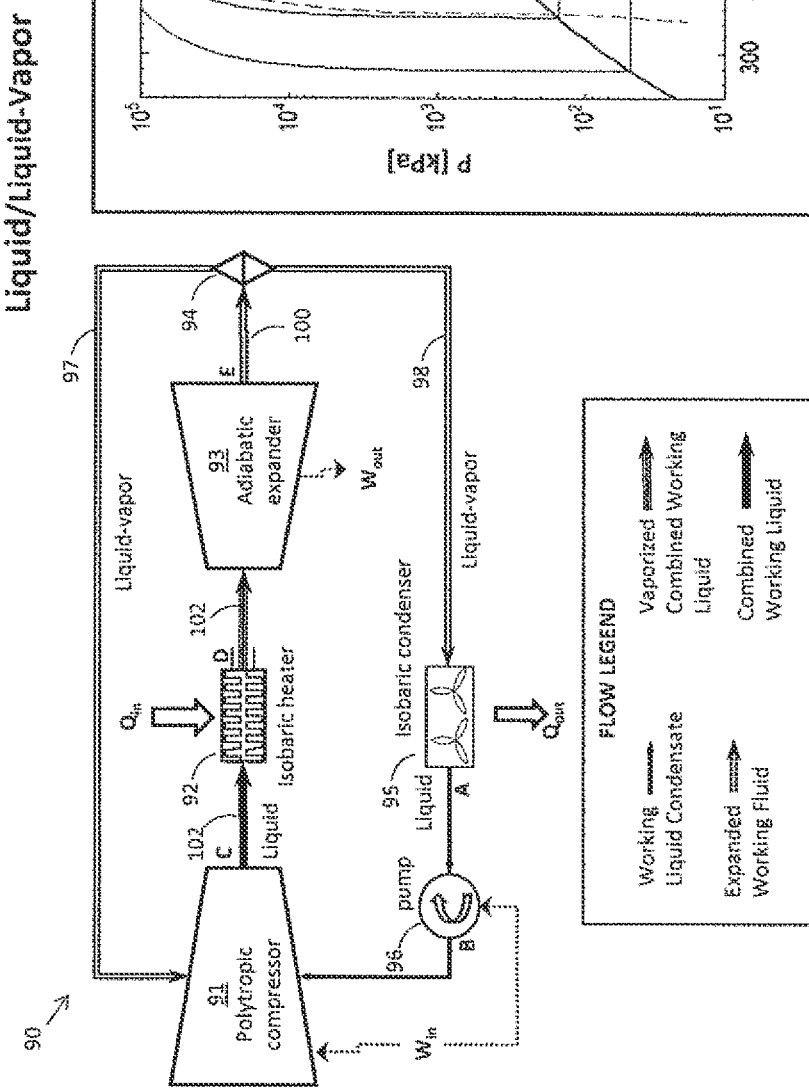
FIG. 10A is a schematic diagram of a physical implementation of the heat engine in which the work streams are implemented as a liquid stream and a liquid-vapor stream, according to an embodiment.
FIG. 10B is an enthalpy diagram depicting each of the work cycles of the liquid stream and the liquid-vapor stream for the engine embodiment of FIG. 10A.

FIG. 10A is a schematic diagram of a physical implementation of a dual-cycle, heat engine in which two cycling working fluids are processed separately for several of the processing steps, combine into a single working stream for some of the processing steps, and re-split into two separate working fluids, in accordance with the embodiment.

As shown, engine 90 includes a polytropic compressor 91, isobaric heater 92, adiabatic expander 93, splitter 94, isobaric condenser 95, and pump 96.

The simultaneous work cycles operative in engine 90 are depicted in the enthalpy diagram of FIG. 10B. As shown, a first working fluid 97 cycles through steps C-D-E, also denoted first working stream, and second working fluid 98 cycles through steps A-B-C-D-E, also denote second working stream.

In cycle 98, liquid-vapor is condensed at isobaric condenser 95 to an enthalpy A, and then pressurized by pump 96 to a pressure B to effectively increase energy content while maintaining a temperature lower than that of second working stream to ensure a temperature gradient enabling capture of heat generated by compression of second working stream 97. Now liquid second working stream 98 is combined with first liquid-vapor working stream 97 at compressor 91 as first working stream 97 is polytropically compressed to a liquid at pressure C. Liquid second working stream 98 captures the released heat to advantageously boost work extraction when later expanded. The combined working streams 97 and 98, now in liquid form as combined stream 102 and charged with the compression heat generated during compression of first working fluid 97, is isobarically heated by an external heat source to enthalpy D at isobaric heater 92 and then adiabatically expanded to pressure E at adiabatic expander 93 to extract work. Expanded, combined working stream 102 still in liquid-vapor form is split at splitter 94 into first working stream 97 and second working stream 98. Second working stream 98 is condensed at isobaric condenser 95 through isobaric heat removal to enthalpy A whereas first working stream 97 is recycled to polytropic compressor 91 as liquid-vapor.

This engine configuration advantageously ensures that energy content generated by pressurization of second working stream 98 at pump 96 and compression of first working stream 97 at polytropic compressor 91 is preserved within working combined working stream 102. The heightened energy content provides greater work extraction at adiabatic expander 93, as is known in the art.

Figure 11B:
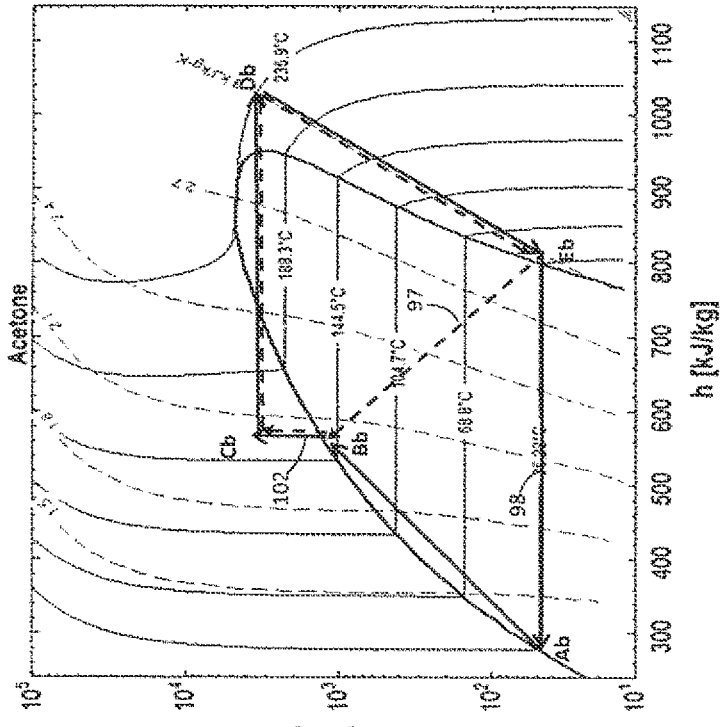
FIG. 11B is an enthalpy diagram depicting each of the work cycles of the liquid stream and the liquid-vapor stream for the engine embodiment of FIG. 11A.
Figure 11A:
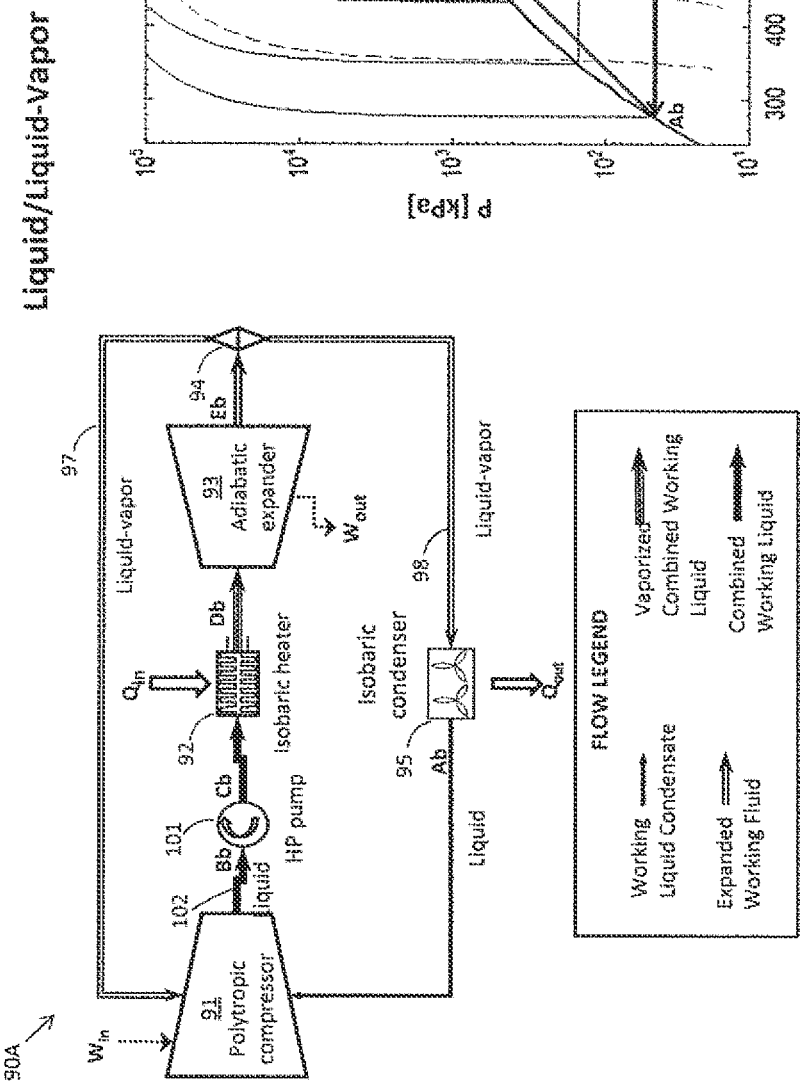
FIG. 11A is a schematic diagram of a physical implementation of a variant embodiment of the heat engine of FIG. 10A, according to an embodiment.

FIG. 11A is a schematic diagram of a physical implementation of a variant embodiment of the heat engine of FIG. 10A in which pumping of combined working stream 102 is delayed until after polytropic compression at compressor 91 of first second working stream 97 where it combines with second working stream 98.

As shown, this variant embodiment, engine 90A includes a polytropic compressor 91, high pressure pump 102, isobaric heater 92, adiabatic expander 93, a splitter 94, and an isobaric condenser 95.

The simultaneous work cycles operative in engine 90A are depicted in the enthalpy diagram of FIG. 11B. Analogous to engine of 90 of FIG. 10A, first working stream 97 cycles through steps Bb-Cb-Db-Eb and second working stream 98 cycles through steps Ab-Bb-Cb-Db-Eb.

In cycle 98, liquid-vapor is condensed at isobaric condenser 95 to enthalpy Ab. Now liquid working stream 98 is combined with first liquid-vapor working stream 97 at compressor 91 after polytropic compression of first working fluid 97 to bring combined working stream 102 to enthalpy Bb. As noted, the release of heat of the polytropic compression of liquid-vapor working stream 97 facilitates compression into a liquid, as is known in the art, and liquid second working stream 98 captures the released compression heat in real time to advantageously boost future work extraction.

The combined working streams 97 and 98, now in liquid form as stream 102 is pressurized by high pressure pump 96 to a pressure Cb and isobarically heated to enthalpy Db at isobaric heater 92 and then adiabatically expanded to pressure Eb to extract work at adiabatic expander 93. The expanded, combined working stream 102 still in liquid-vapor form is split at splitter 94 into first working stream 97 and second working stream 98. Second working stream 98 is condensed into a liquid to enthalpy A at isobaric condenser 95 through isobaric heat removal whereas first working stream 97 is recycled to polytropic compressor 91 as liquid-vapor to repeat the cycle.

Figures 12A, 12B:
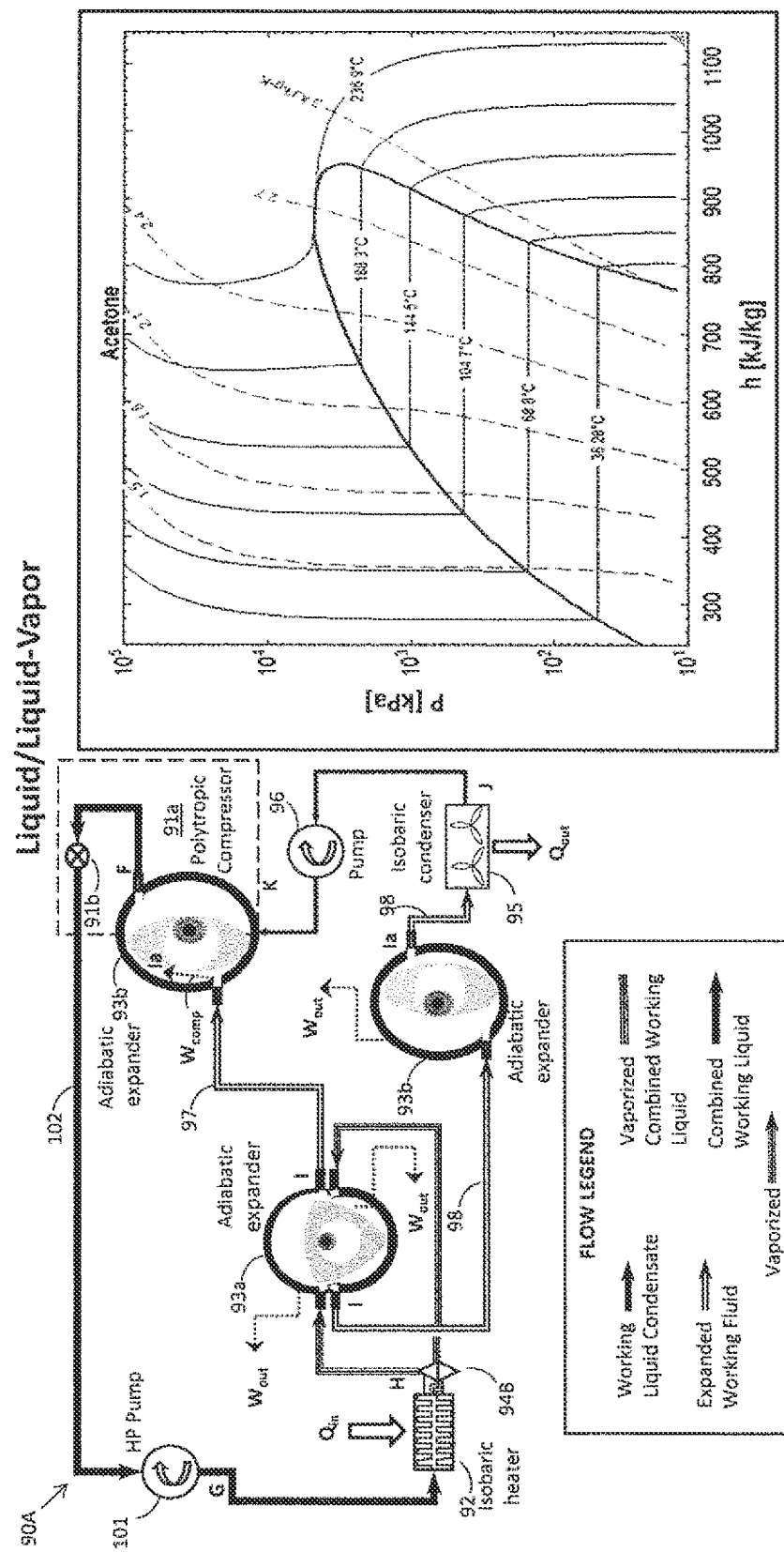
FIG. 12A is a schematic diagram of a Wankel-based implementation of the heat engine in which the work streams are implemented as a liquid stream and a liquid-vapor stream, according to an embodiment.
FIG. 12B is an enthalpy diagram depicting each of the work cycles of the liquid stream and the liquid-vapor stream for the Wankel-based embodiment of FIG. 12A.

FIG. 12A is a schematic diagram of a Wankel-based implementation of the heat engine depicted in FIG. 10A.

As shown, the Wankel-based implementation includes an isobaric heater 92, Wankel-type adiabatic-expanders 93a and 93b, an isobaric condenser 95, a pump 96 a combination Wankel-type adiabatic-expander and polytropic-compressor 93c in which compression and expansion operations are actuated in accordance with valve operation of valve 91b, high-pressure pump 101, and stream splitter 94B.

The simultaneous work cycles operative in engine 90c are depicted in the enthalpy diagram of FIG. 12B. Analogous to engine of 90 of FIG. 10A, first working stream 97 cycles through steps F-G-H-I and second working stream 98 cycles through steps J-K-F-G-H-I.

Combined stream 102 is formed at polytropic compressor 91a when condensed second stream 98 and polytropically compressed first stream 97 combine into combined stream 102 at enthalpy F at combination adiabatic-expander and polytropic-compressor 93c. Combined stream 102 is pressurized to pressure G at high pressure pump 101 and vaporized to enthalpy H at isobaric heater 92. Combined stream 102 is split at stream splitter 94B into first working stream 97 and second working stream 98 and both simultaneously feed into two different inlets of Wankel-type expander 93a where each are adiabatically expanded in parallel to extract work to enthalpy I. Partially expanded second stream 98 is adiabatically expanded again to enthalpy Ia at Wankel-type expander 93b and isobarically condensed to enthalpy J at isobaric condenser 95, pressurized to pressure Ja at pump 96 and proceed to complete the cycle upon fusing with first working stream 97.

Processing of first stream 97 continues after the above-noted, first adiabatic expansion at adiabatic expander 93a to second adiabatic expander 93b and undergoes additional adiabatic expansion to enthalpy Ia where work is extracted. This work is utilized to compress vapor form first working stream 97 remaining in compressor 91a after driving the previous cycle of polytropic compression. During polytropic compression to F, working 98 captures generated compression heat and combines with first working stream 97 to form combined stream 102.

Figures 13A, 13B:
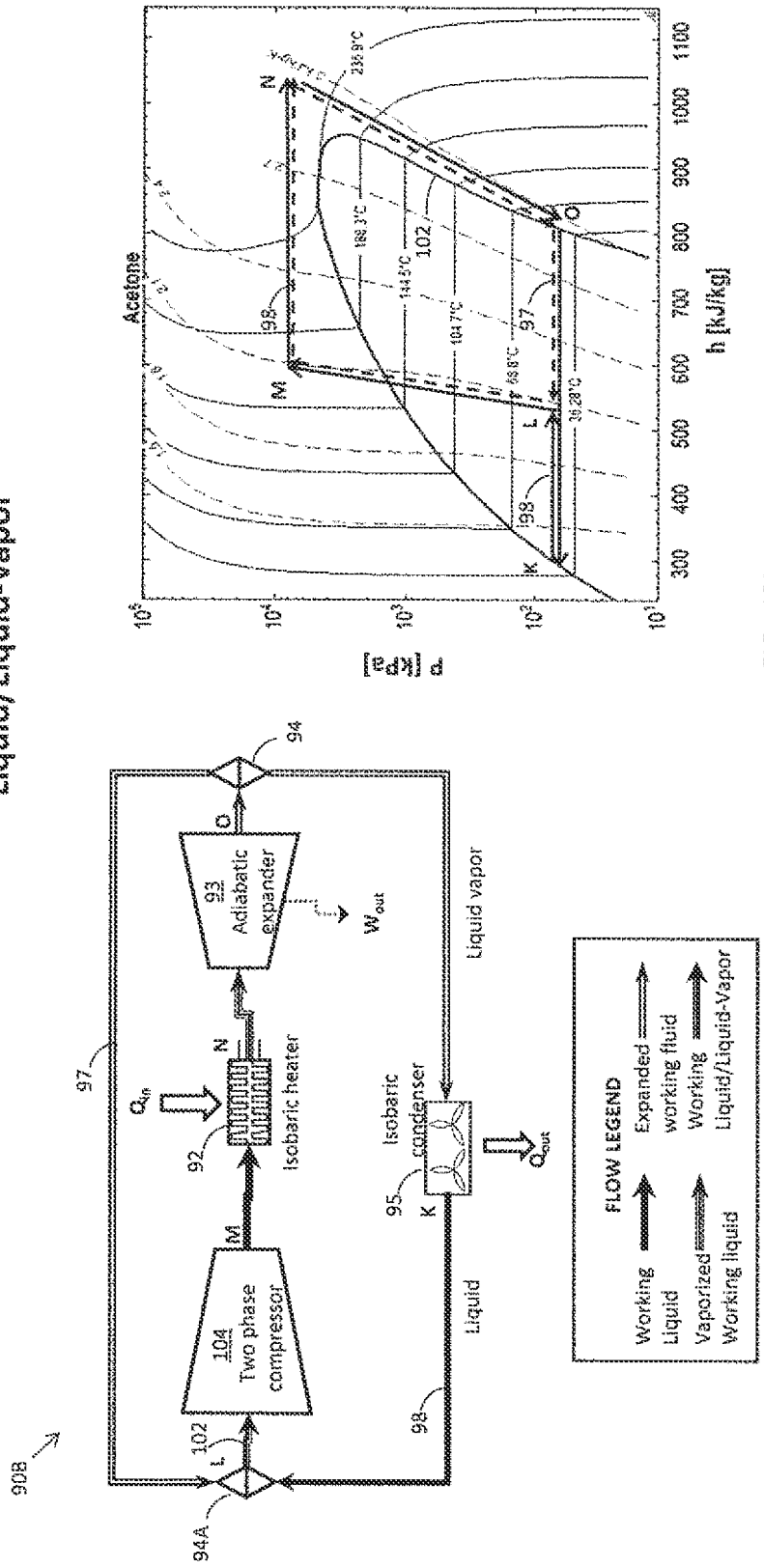
FIG. 13A is a schematic diagram of a variant implementation of the heat engine of FIG. 10A employing isobaric mixing of the working streams prior to adiabatic compression of the liquid-vapor stream, according to an embodiment.
FIG. 13B is an enthalpy diagram depicting each of the work cycles of the liquid stream and the liquid-vapor stream for the embodiment of FIG. 13A.

FIG. 13A is a schematic diagram of a variant implementation of the heat engine of FIG. 10A employing partial condensation of the liquid-vapor stream, according to an embodiment. As shown, engine 90B includes a two-phase compressor 104, isobaric heater 92, adiabatic expander 93, isobaric condenser 95, splitter 94 and isobaric combiner 94A.

FIG. 13B is an enthalpy diagram depicting the work cycles L-M-N-O of first working fluid 97, L-M-N-O-K of second working fluid 98, and L-M-N-O-K of combined working stream 102 for the embodiment of FIG. 13A.

As shown, after adiabatic expansion of combined working stream 102 to pressure O at adiabatic expander 93, combined working fluid 102 is split into first working fluid 97 and second working fluid 98 at splitter 94. Second working fluid 98 is condensed to pressure K through heat removal at isobaric condenser 95 and isobarically mixed with second working fluid 98 to form combined working stream 102 to enthalpy L at isochoric combiner 94A. Combined working stream 102 is fed into a two-phase compressor 104 where the vapor component is compressed into a liquid that combines with now liquid working fluid 98 to form combined working stream 102 at pressure M. It should be appreciated that the isobaric mixing advantageously enables combined working stream 102 to achieve pressure M without the additional heat input associated with typical Rankine cycles. Continuing with the cycle, Combined working stream 102 advantageously preserves compression heat generated during compression of first working fluid 97. Combined working stream 102 is vaporized to enthalpy N with the addition of heat at isobaric heater 92, and adiabatically expanded to pressure O at adiabatic expander 93 to extract work. Two-phase compressors can be implemented with various volumetric compressors like Wankel-type compressors, scroll compressors, or other compressors providing such functionality.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of exploiting heat during work generation in heat-engines, the method comprising:
    compressing vapor of a first liquid-vapor working fluid while contacting a second liquid working fluid so as to form a combined liquid working fluid containing compression heat and condensation heat released from compression and condensation of the vapor of the first liquid-vapor working fluid;
    isobarically vaporizing the combined liquid working fluid into a vaporized combined working fluid;
    expanding the vaporized combined working fluid into an expanded combined working fluid so as to extract work from the combined working fluid;
    splitting the expanded combined working fluid into the first liquid-vapor working fluid and a second liquid-vapor working fluid; and
    isobarically condensing vapor of the second liquid-vapor working fluid into the liquid working fluid.

2. The method of claim 1, further comprising pressurizing the second liquid working fluid prior to the compressing vapor of a first liquid-vapor working.

3. The method of claim 1, wherein the expanding the vaporized combined working fluid is implemented adiabatically.

4. The method of claim 1, wherein the first liquid-vapor working fluid and the second working fluid have the same identity.

5. The method of claim 4, further comprising pressurizing the combined liquid working fluid.

6. The method of claim 1, wherein the adiabatically expanding the vaporized combined working fluid is implemented in two separate stages.

7. A method of exploiting heat during work generation in heat-engines, the method comprising:
    mixing a liquid-vapor working fluid and a liquid working fluid so as to form a two-phase combined working fluid;
    compressing vapor of the combined working fluid into a liquid while contacting a liquid component of the combined working fluid working fluid so as to capture compression heat and condensation heat;
    isobarically vaporizing the combined working fluid into a vaporized combined working fluid;
    expanding the vaporized combined working fluid into an expanded combined working fluid so as to extract work from the combined working fluid;
    splitting the expanded combined working fluid into the liquid-vapor working fluid and a second liquid-vapor working fluid; and
    isobarically condensing vapor of the second liquid-vapor working fluid into the liquid working fluid.

8. The method of claim 7, wherein the compressing vapor of a first liquid-vapor working fluid is implemented through adiabatic compression.

9. The method of claim 8, further comprising pressurizing the liquid component of the combined working fluid working fluid.

10. A dual working-cycle, heat engine comprising:
- a compressor operative to compress and condense vapor of a first liquid-vapor working fluid while contacting a second liquid working fluid so as to form a combined liquid working fluid containing compression heat and condensation heat released from compression of the vapor of the first liquid-vapor working fluid;
- an isobaric heater operative to vaporize the combined liquid working fluid into a vaporized combined working fluid;
- at least one expander operative to expand the vaporized combined working fluid into an expanded combined working fluid;
- a splitter operative to split the expanded combined working fluid into the first liquid-vapor working fluid and a second liquid-vapor working fluid; and
- an isobaric condenser operative to condense vapor of the second liquid-vapor working fluid into the liquid working fluid.

11. The heat engine of claim 10, further comprising a pump operative to pressurize the second liquid working.

12. The heat engine of claim 10, wherein the first liquid-vapor working fluid and the second working fluid have the same identity.

13. The heat engine of claim 1, wherein the at least one expander is implemented as a Wankel expander.

14. A dual working-cycle, heat engine comprising:
- a combiner operative to mix a liquid-vapor working fluid and a liquid working fluid so as to form a two-phase combined working fluid;
- a two-phase compressor operative to compress vapor of the combined working fluid into a liquid while contacting a liquid component of the combined working fluid working fluid so as to capture compression heat and compression heat;
- an isobaric heater operative to vaporize the combined working fluid into a vaporized combined working fluid;
- an expander operative to expand the vaporized combined working fluid into an expanded combined working fluid so as to extract work from the combined working fluid;
- a splitter operative to split the expanded combined working fluid into the liquid-vapor working fluid and a second liquid-vapor working fluid; and
- an isobaric condenser operative to condense vapor of the second liquid-vapor working fluid into the liquid working fluid.

15. The heat engine of claim 14, wherein the two-phase compressor is implemented as an adiabatic two-phase compressor.

16. The heat engine of claim 14, wherein the expander is implemented as an adiabatic expander.

* * * * *